United States Patent
Jones et al.

(10) Patent No.: US 12,166,796 B2
(45) Date of Patent: *Dec. 10, 2024

(54) UNIFORM RESOURCE LOCATOR CLASSIFIER AND VISUAL COMPARISON PLATFORM FOR MALICIOUS SITE DETECTION

(71) Applicant: Proofpoint, Inc., Sunnyvale, CA (US)

(72) Inventors: Brian Sanford Jones, Cary, NC (US); Zachary Mitchell Abzug, Durham, NC (US); Jeremy Thomas Jordan, Raleigh, NC (US); Giorgi Kvernadze, Salt Lake City, UT (US); Dallan Quass, Lindon, UT (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,945

(22) Filed: Sep. 12, 2023

(65) Prior Publication Data

US 2023/0421607 A1    Dec. 28, 2023

Related U.S. Application Data

(63) Continuation of application No. 16/831,009, filed on Mar. 26, 2020, now Pat. No. 11,799,905.
(Continued)

(51) Int. Cl.
*H04L 9/40* (2022.01)
*G06F 16/51* (2019.01)
(Continued)

(52) U.S. Cl.
CPC .......... *H04L 63/1483* (2013.01); *G06F 16/51* (2019.01); *G06F 16/9566* (2019.01);
(Continued)

(58) Field of Classification Search
None
See application file for complete search history.

(56) References Cited

U.S. PATENT DOCUMENTS

| | | | |
|---|---|---|---|
| 8,521,667 | B2 | 8/2013 | Zhu et al. |
| 10,305,922 | B2 * | 5/2019 | Devi Reddy ....... H04L 63/1425 |

(Continued)

FOREIGN PATENT DOCUMENTS

| | | |
|---|---|---|
| CN | 107862050 A | 3/2018 |
| CN | 109005145 A | 12/2018 |
| EP | 3457661 A1 | 3/2019 |

OTHER PUBLICATIONS

Nov. 13, 2023—(US) Notice of Allowance—U.S. Appl. No. 18/104,487.
(Continued)

*Primary Examiner* — Joseph P Hirl
*Assistant Examiner* — Hassan Saadoun
(74) *Attorney, Agent, or Firm* — Banner & Witcoff, Ltd.

(57) ABSTRACT

Aspects of the disclosure relate to detecting and identifying malicious sites using machine learning. A computing platform may receive image data of a graphical rendering of a resource available at a uniform resource locator (URL). The computing platform may compute a computer vision vector representation of the image data. The computing platform may compare the computer vision vector representation of the image data to stored numeric vectors representing page elements, resulting in a feature indicating whether the computer vision vector representation of the image data is visually similar to a known page element, and may input the feature to a classifier. The computing platform may receive, from the classifier, a phish classification score indicating a likelihood that the URL is malicious. In response to determining that the phish classification score exceeds a first
(Continued)

phish classification threshold, the computing platform may cause a cybersecurity server to perform a first action.

20 Claims, 9 Drawing Sheets

Related U.S. Application Data

(60) Provisional application No. 62/823,733, filed on Mar. 26, 2019.

(51) Int. Cl.
*G06F 16/955* (2019.01)
*G06F 18/21* (2023.01)
*G06F 21/56* (2013.01)
*G06N 3/08* (2023.01)
*G06N 20/00* (2019.01)
*G06N 20/10* (2019.01)

(52) U.S. Cl.
CPC ............ *G06F 18/217* (2023.01); *G06F 21/56* (2013.01); *G06N 3/08* (2013.01); *G06N 20/00* (2019.01); *G06N 20/10* (2019.01); *H04L 63/1408* (2013.01); *H04L 63/1416* (2013.01); *H04L 63/1441* (2013.01); *G06V 2201/09* (2022.01)

(56) References Cited

U.S. PATENT DOCUMENTS

| | | | |
|---|---|---|---|
| 10,999,322 B1 * | 5/2021 | Yuan | ..................... G06F 16/583 |
| 2012/0158626 A1 | 6/2012 | Zhu et al. | |
| 2014/0033307 A1 * | 1/2014 | Schmidtler | ......... H04L 63/1483 726/22 |
| 2014/0298460 A1 | 10/2014 | Xue et al. | |
| 2014/0359760 A1 | 12/2014 | Gupta et al. | |
| 2016/0057167 A1 * | 2/2016 | Bach | ..................... H04L 63/101 726/23 |
| 2017/0134397 A1 * | 5/2017 | Dennison | ............ G06F 16/9535 |
| 2018/0004948 A1 * | 1/2018 | Martin | ................ H04L 63/1425 |
| 2018/0115584 A1 * | 4/2018 | Alhumaisan | ........ H04L 63/1483 |
| 2019/0014149 A1 | 1/2019 | Cleveland et al. | |
| 2019/0019058 A1 * | 1/2019 | Woodbridge | ........ G06V 10/768 |
| 2019/0132334 A1 * | 5/2019 | Johns | ..................... G06F 21/562 |
| 2020/0036750 A1 | 1/2020 | Bahnsen et al. | |

OTHER PUBLICATIONS

Jul. 17, 2020 (EP) Extended European Search Report—App. 20166097.4.
Jul. 1, 2020 (EP) Extended European Search Report—App. 20166094.7.
Sep. 16, 2021 (EP) First Examination Report—App. 20166091.7.
Yang, Wenchuan, et al., "Detecting Malicious URLs via a Keyword-Based Convolutional Gated-Recurrent-Unit Neural Network", IEEE Access, vol. 7, Jan. 20, 2019 (Jan. 20, 2019), pp. 29891-29900, XP011715559, DOI: 10.1109/ACCESS.2019.2895751.
Mar. 3, 2022—(EP) Office Action—App 20166097.4.
May 26, 2022—(US) Non-Final Office Action—U.S. Appl. No. 16/830,923.
Sep. 15, 2022—(US) Non-Final Office Action—U.S. Appl. No. 16/831,009.
Sep. 30, 2022 (US) Notice of Allowance U.S. Appl. No. 16/830,923.
Dec. 1, 2022 Notice of Allowance U.S. Appl. No. 16/830,923.
Jul. 12, 2023—(US) Notice of Allowance—U.S. Appl. No. 16/831,009.
Jul. 20, 2023—(US) Office Action—U.S. Appl. No. 18/104,487.
Jun. 29, 2023—(EP) Notice of Allowance—App. No. 20166091.

* cited by examiner

UNIFORM RESOURCE LOCATOR CLASSIFIER AND VISUAL COMPARISON PLATFORM FOR MALICIOUS SITE DETECTION

CROSS-REFERENCE TO RELATED APPLICATIONS

This application is a Continuation application of U.S. Ser. No. 16/831,009, filed Mar. 26, 2020 (entitled "Uniform Resource Locator Classifier and Visual Comparison Platform for Malicious Site Detection") and claims the benefit of and priority to U.S. Provisional Patent Application Ser. No. 62/823,733, filed Mar. 26, 2019, and entitled "Using Machine Learning Techniques to Identify Phishing Websites," which is incorporated by reference herein in its entirety.

TECHNICAL FIELD

Aspects of the disclosure relate to message processing and management systems, data processing methods, machine learning systems, and communication systems and networks. In particular, one or more aspects of the disclosure relate to detecting and identifying malicious sites using machine learning.

BACKGROUND

Increasingly, organizations face various cybersecurity threats through electronic communications. Various methods of message analysis have been developed to combat these threats. It remains difficult, however, to automatically identify malicious links in messages. This is particularly true in circumstances where limited computing resources are available for analysis. Moreover, risks posed by undetected malicious links may arise with regard to both external communications and internal communications. Attempts to integrate such analysis techniques into efficient and effective automated processes present various technical challenges, particularly when trying to balance enterprise network security against the optimal consumption of computing resources, such as processing power and network bandwidth.

SUMMARY

Aspects of the disclosure provide technical solutions that overcome one or more of the technical problems described above and/or other technical challenges. For instance, one or more aspects of the disclosure relate to detecting and identifying malicious sites using machine learning.

In accordance with one or more embodiments, a computing platform having at least one processor, a communication interface, and memory may receive a uniform resource locator (URL). The computing platform may parse and tokenize the URL to reduce the URL into a plurality of components. The computing platform may identify one or more human-engineered features of the URL. The computing platform may compute a vector representation of the URL to identify one or more deep learned features of the URL. The computing platform may concatenate the one or more human-engineered features of the URL to the one or more deep learned features of the URL, which may result in a concatenated vector representation. By inputting the concatenated vector representation of the URL to a URL classifier, the computing platform may compute a phish classification score. In response to determining that the phish classification score exceeds a first phish classification threshold, the computing platform may cause a cybersecurity server to perform a first action.

In one or more embodiments, the computing platform may identify the one or more human-engineered features of the URL by parsing the URL to identify components of the URL, which may be one or more of: a protocol, a top level domain (TLD), a domain, a subdomain, a port, a port type, a path, path components, or the like. In one or more instances, the computing platform may identify the one or more human engineered features of the URL by identifying a popularity of the URL; popularity of a domain of the URL; popularity of a subdomain and a domain of the URL; popularity of a subdomain, a domain, and one or more path components of the URL; or the like.

In one or more embodiments, the computing platform may generate a popularity score for each of a plurality of URLs, domains, subdomains, or path components, which may correspond to a number of times during a predetermined period that corresponding URLs, domains, subdomains, or path components were accessed, a number of users who accessed the corresponding URLs, domains, subdomains, or path components, or the like. The computing platform may store, in a popularity index, the popularity scores, and may store the popularity scores along with a correlation to their respective URLs, domains, subdomains, and path components. In these embodiments, the computing platform may be configured to access the popularity scores by applying a lookup function.

In one or more embodiments, the computing platform may identify the one or more human-engineered features of the URL by identifying that the URL contains an instance of brand mimicry. In one or more embodiments, the computing platform may identify the one or more human-engineered features of the URL by identifying that the URL contains a homoglyph, identifying a character length of the URL, identifying an encrypted protocol, identifying a page extension of the URL, identifying a signature associated with a domain generation algorithm, identifying a presence of a random substring, identifying a presence of one or more strings from a lexicon in the URL, identifying a number of subdomains of the URL, or the like.

In one or more embodiments, the computing platform may compute the vector representation of the URL using a neural network. In one or more embodiments, the neural network may be pre-trained using a language modeling task, another self-supervised task, or the like. In one or more embodiments, the computing platform may identify the one or more human-engineered features of the URL by: 1) identifying that the URL is a redirector, 2) initiating one or more requests to capture a redirection chain of one or more URLs associated with redirection actions taken by each URL in the redirection chain, and 3) identifying one or more features of URLs associated with the chain of the one or more URLs associated with the redirection chain.

In one or more embodiments, the URL classifier may be a neural network. In one or more embodiments, in response to determining that the phish classification score exceeds a second phish classification threshold, the computing platform may cause the cybersecurity server to perform a second action different from the first action.

In one or more embodiments, the computing platform may cause the cybersecurity server to perform the first action by setting a first flag. The computing platform may cause the cybersecurity server to perform the second action by setting a second flag, where: 1) the first flag and the second flag may be set in a cybersecurity database hosted by one of: the computing platform or a central repository, and 2) the cybersecurity database may be accessible by the cybersecurity server.

In one or more embodiments, the cybersecurity server may be configured to monitor the cybersecurity database at a predetermined interval to detect flags. In one or more embodiments, in response to detecting the first flag, the computing platform may perform the first action by generating one or more commands directing a visual similarity classification platform to analyze content of the URL. In these embodiments, in response to detecting the second flag, the computing platform may perform the second action by one or more of: 1) generating one or more commands directing another computing device to display a graphical user interface indicating that the URL is malicious, or 2) adding the URL to a list of blocked URLs.

In one or more embodiments, in response to detecting the first flag, the computing platform may perform the first action by generating one or more commands directing a holistic classification platform to analyze content of the URL. In these embodiments, in response to detecting the second flag, the computing platform may perform the second action by one or more of: 1) generating one or more commands directing another computing device to display a graphical user interface indicating that the URL is malicious, or 2) adding the URL to a list of blocked URLs.

In one or more embodiments, based on a failure to detect a flag, the computing platform may determine that the phish classification score does not exceed the first phish classification threshold or the second phish classification threshold. Based on the determination that the phish classification score does not exceed the first phish classification threshold or the second phish classification threshold, the computing platform may determine that the URL is legitimate.

In accordance with one or more additional and/or alternative embodiments, a computing platform having at least one processor, a communication interface, and memory may receive image data of a graphical rendering of a resource available at a uniform resource locator (URL). The computing platform may compute a computer vision vector representation of the image data. The computing platform may compare the computer vision vector representation of the image data to a plurality of stored numeric vectors representing page elements, resulting in a feature indicating whether the computer vision vector representation of the image data is visually similar to a known page element. The computing platform may input the feature indicating whether the computer vision vector representation of the image data is visually similar to the known page element to a classifier. The computing platform may receive, from the classifier, a phish classification score indicating a likelihood that the URL is malicious. In response to determining that the phish classification score exceeds a first phish classification threshold, cause a cybersecurity server to perform a first action.

In one or more embodiments, the computing platform may generate a screenshot database that includes images of a plurality of URLs and their corresponding image data, where: 1) the plurality of URLs are selected by the computing platform based on one or more of: previous attacks corresponding to the URLs, anticipated attacks corresponding to the URLs, URL popularity, or the like, and 2) the plurality of URLs correspond to one or more of: internal websites or external websites.

In one or more embodiments, the computing platform may update the screenshot database by: 1) identifying that a page image corresponding to a URL of the plurality of URLs has changed (e.g., where a previous page image corresponding to the URL of the plurality of URLs is stored in the screenshot database), 2) in response to determining that the page image corresponding to a URL of the plurality of URLs has changed: a) capturing the page image corresponding to the URL of the plurality of URLs, resulting in a captured page image corresponding to the URL of the plurality of URLs, and 3) adding the captured page image corresponding to the URL of the plurality of URLs to the screenshot database.

In one or more embodiments, the computing platform may generate the screenshot database by computing, for each URL of the plurality of URLs, a computer vision vector representation of image data corresponding to the URL. In one or more embodiments, the computing platform may compare the computer vision vector representation of the image data to the plurality of stored numeric vectors representing page elements by identifying, using a hash table lookup function, an exact match between the image data and a specific page element of the page elements. In these embodiments, the computing platform may alternatively identify an inexact match between the image data and the specific page element of the page elements using a nearest neighbor search, radius search, or the like.

In one or more embodiments, the computing platform may compare the image data of the URL to image data captured from one or more ancestor pages, where the comparison results in an ancestor similarity score. In one or more embodiments, the computing platform may identify page elements of the one or more ancestor pages.

In one or more embodiments, the computing platform may compare the image data of the URL to the image data captured from the one or more ancestor pages by comparing page elements of the URL to the identified page elements of the one or more ancestor pages. In one or more embodiments, the computing platform may compare the image data of the URL to the image data captured from the one or more ancestor pages by: 1) generating, for the one or more ancestor pages, an object list that includes the corresponding identified page elements, 2) applying object detection to the image data of the URL to identify included objects, where the identified included objects comprise one or more of: a logo, a brand graphic, a login pane, a logo aspect ratio, a background image, or the like, and 3) comparing the identified included objects to the object list.

In one or more embodiments, the computing platform may compare the image data of the URL to the image data captured from the one or more ancestor pages by performing: 1) a visual comparison, where the visual comparison includes one or more of: a color analysis, a deep learning vector comparison, logo comparison, optical character comparison between the graphical rendering of the URL and the one or more ancestor pages, or the like, or 2) a non-visual comparison, where the non-visual comparison is a comparison of markup, code, or text corresponding to the URL and markup, code, or text corresponding to the one or more ancestor pages. In one or more embodiments, the computing platform may compute the computer vision vector representation of the image data using a convolutional neural network, which may be trained using metric learning.

In one or more embodiments, the known page element may be one of: a rendered page screenshot, a logo, login form, other visual page element, or the like, and the classifier may be a machine learning classifier or a rule-based classifier. In one or more embodiments, in response to determining that the phish classification score exceeds a second phish classification threshold, the computing platform may cause the cybersecurity server to perform a second action different from the first action.

In one or more embodiments, the computing platform may cause the cybersecurity server to perform the first action by setting a first flag. The computing platform may cause the cybersecurity server to perform the second action by setting a second flag, where: 1) the first flag and the second flag may be set in a cybersecurity database hosted by one of: the computing platform or a central repository, and 2) the cybersecurity database may be accessible by the cybersecurity server.

In one or more embodiments, the cybersecurity server may be configured to monitor the cybersecurity database at a predetermined interval to detect flags. In one or more embodiments, in response to detecting the first flag, the computing platform may perform the first action by generating one or more commands directing another classification platform to analyze the URL. In response to detecting the second flag, the computing platform may perform the second action by one or more of: 1) generating one or more commands directing another computing device to display a graphical user interface indicating that the URL is malicious, or 2) adding the URL to a list of blocked URLs.

In one or more embodiments, the computing platform may generate the one or more commands directing the other classification platform to analyze the URL by generating one or more commands directing the other classification platform to analyze content of the URL using a holistic classifier. In one or more embodiments, based on a failure to detect a flag, the computing platform may determine that the phish classification score does not exceed the first phish classification threshold. Based on the determination that the phish classification score does not exceed the first phish classification threshold, the computing platform may determine that the URL is legitimate.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
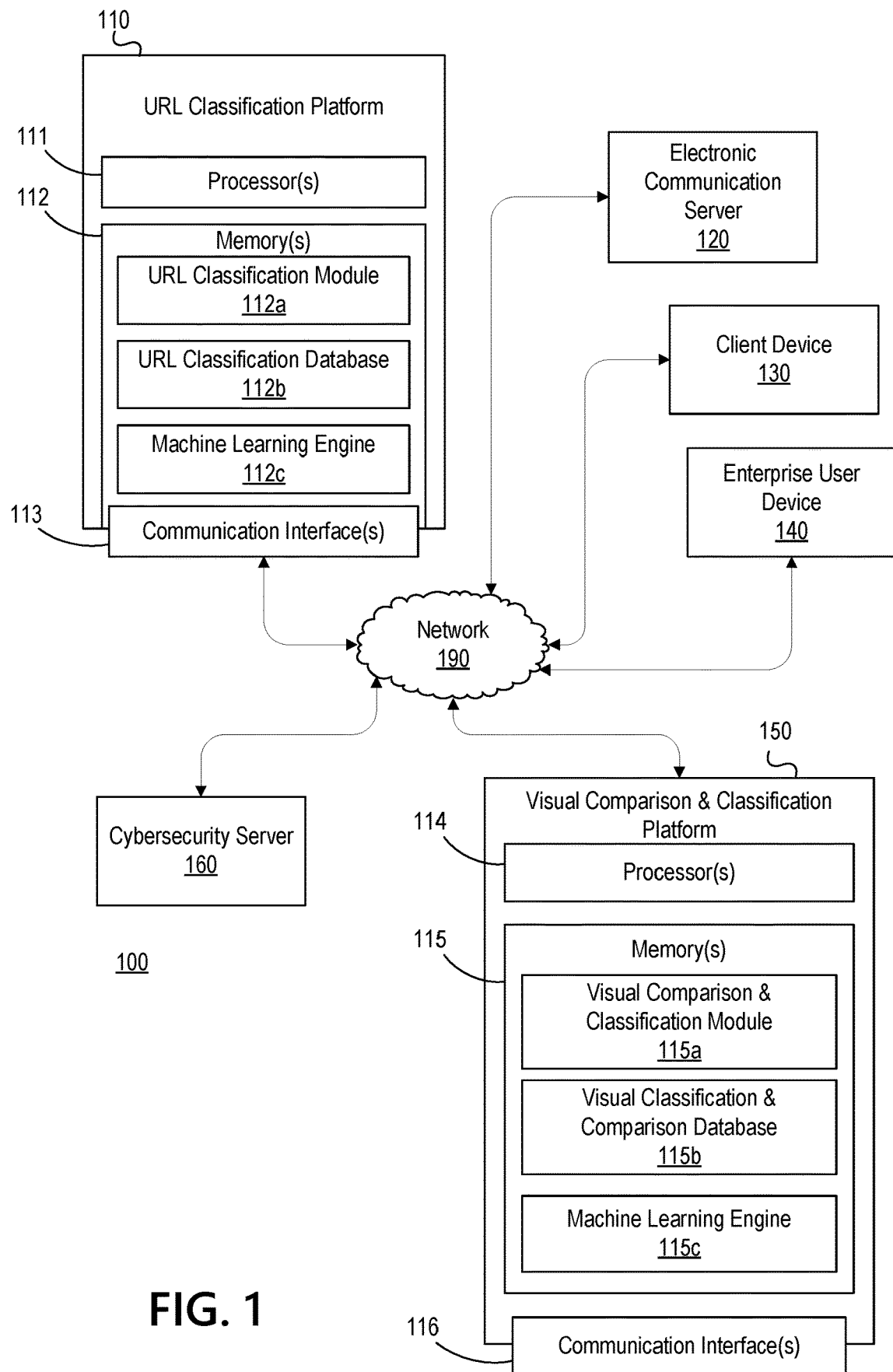
FIG. 1 depicts an illustrative operating environment for detecting and identifying malicious sites using machine learning in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to identifying phishing websites and/or other malicious sites using machine-learning technology. For example, one or more of the systems and methods described herein may relate to a URL string classifier. In some instances, this classifier may analyze a character string of a URL and/or features extracted from the character string to classify the URL as either likely legitimate or possibly malicious (e.g., and thus in need of further analysis and/or requiring other protective action(s)). In addition, one or more of the systems and methods described herein may relate to a visual similarity classifier. For example, once a page is fully rendered and, in some instances, once its embedded scripts have been run, this classifier may capture an image of the page, generate a vector representation of the image, and then perform a reverse image search of the page's image using a database of page screenshots to determine if the page more closely matches other phishing pages, other malicious pages, other legitimate pages, or the like.

One or more aspects of the disclosure thus provide technical solutions to various technical problems associated with phish identification. For example, due to limited computing resources, it may be difficult to scrape an entirety of published webpages for analysis. By applying a screening/filtering procedure (e.g., based on URL string classification, visual similarity classification, or the like) to these pages based on their corresponding URLs, a smaller subset of URLs may be routed for further processing. For example, a classifier may assign confidence scores to the URLs during classification, and may define one or more thresholds (e.g., such as a first and second threshold). If the classifier determines that the confidence score for a URL does not exceed the first threshold, the classifier may determine that the corresponding URL is not likely malicious, and may classify the URL accordingly without routing the URL for further analysis. Similarly, if the classifier determines that the confidence score for the URL exceeds the second threshold, the classifier may determine that the corresponding URL is likely malicious, and may classify the URL as such without routing the URL on for further analysis. If, however, the classifier determines that the confidence score for the URL falls between the first threshold and the second threshold, the classifier may route the URL for further analysis. Accordingly, one or more of the systems and methods described herein may reduce processing load (e.g., by reducing the number of URLs that are subjected to relatively more in depth and computationally expensive further analysis procedures) while maintaining and/or increasing the accuracy of detecting phishing sites and/or other malicious sites. Furthermore, one or more of the systems and methods described herein may increase network security by preventing identified phish from persisting through the exchange of messages and/or otherwise being accessed at an enterprise network.

FIG. 1 depicts an illustrative operating environment for applying machine learning in phish identification in accordance with one or more example embodiments. Referring to FIG. 1, computing environment 100 may include various computer systems, computing devices, networks, and/or other operating infrastructure. For example, computing environment 100 may include a URL classification platform 110, an electronic communication server 120, a client device 130, an enterprise user device 140, a visual comparison and classification platform 150, a cybersecurity server 160, and a network 190.

Network 190 may include one or more wired networks and/or one or more wireless networks that interconnect URL classification platform 110, electronic communication server 120, client device 130, enterprise user device 140, visual comparison and classification platform 150, cybersecurity server 160, and/or other computer systems and/or devices. In addition, each of URL classification platform 110, electronic communication server 120, client device 130, enterprise user device 140, visual comparison and classification platform 150, and cybersecurity server 160 may be special purpose computing devices configured to perform specific functions, as illustrated in greater detail below, and may include specific computing components such as processors, memories, communication interfaces, and/or the like.

URL classification platform 110 may include one or more processor(s) 111, one or more memory(s) 112, and one or more communication interface(s) 113. In some instances, URL classification platform 110 may be made up of a plurality of different computing devices, which may be distributed within a single data center or a plurality of different data centers. In these instances, the one or more processor(s) 111, one or more memory(s) 112, and one or more communication interface(s) 113 included in URL classification platform 110 may be part of and/or otherwise associated with the different computing devices that form URL classification platform 110.

In one or more arrangements, processor(s) 111 may control operations of URL classification platform 110. Memory(s) 112 may store instructions that, when executed by processor(s) 111, cause URL classification platform 110 to perform one or more functions, as discussed below. Communication interface(s) 113 may include one or more wired and/or wireless network interfaces, and communication interface(s) 113 may connect URL classification platform 110 to one or more networks (e.g., network 190) and/or enable URL classification platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause URL classification platform 110 to perform various functions) and/or databases (which may, e.g., store data used by URL classification platform 110 in performing various functions). For example, memory(s) 112 may store and/or otherwise provide URL classification module 112a, URL classification database 112b, and a machine learning engine 112c. In some instances, URL classification module 112a may store instructions that cause URL classification platform 110 to apply machine learning for phishing identification, and/or execute one or more other functions described herein. Additionally, URL classification database 112b may store data that is used by URL classification platform 110 in applying machine learning for phishing identification and/or in executing one or more other functions described herein. Furthermore, machine learning engine 112c may store instructions and/or data that may cause and/or be used by URL classification platform 110 to identify phishing websites, dynamically tune one or more thresholds used in phishing identification, and/or execute one or more other functions described herein.

Electronic communication server 120 may be and/or include one or more computing devices (e.g., servers, server blades, enterprise devices, or the like) that may be configured to host one or more electronic messaging services (e.g., e-mail, or the like). Furthermore, the electronic communication server 120 may be configured to facilitate communication between one or more devices and to route messages for classification at the URL classification platform 110, visual comparison and classification platform 150, and/or other classification platforms.

Client device 130 may be configured to be used by a first user (who may, e.g., be attempting to transmit a legitimate message, phish message, or the like). In some instances, client device 130 may be configured to present one or more user interfaces associated with an electronic messaging application, receive input composing new messages, display content associated with received messages, display alerts, and/or otherwise facilitate sending, receiving, and/or otherwise exchanging messages and/or other data with one or more other client devices, enterprise user devices (e.g., enterprise user device 140, or the like).

Enterprise user device 140 may be configured to be used by an administrative user (who may, e.g., be a network administrator of an electronic messaging provider and/or a cybersecurity analyst associated with an enterprise organization operating URL classification platform 110). Enterprise user device 140 may be configured to present one or more user interfaces associated with an operator dashboard, receive and/or display one or more alerts, and/or otherwise facilitate monitoring and management of one or more systems and/or devices included in computing environment 100.

Visual comparison and classification platform 150 may include one or more processor(s) 114, one or more memory(s) 115, and one or more communication interface(s) 116. In some instances, visual comparison and classification platform 150 may be made up of a plurality of different computing devices, which may be distributed within a single data center or a plurality of different data centers. In these instances, the one or more processor(s) 114, one or more memory(s) 115, and one or more communication interface(s) 116 included in visual comparison and classification platform 150 may be part of and/or otherwise associated with the different computing devices that form visual comparison and classification platform 150.

In one or more arrangements, processor(s) 114 may control operations of visual comparison and classification platform 150. Memory(s) 115 may store instructions that, when executed by processor(s) 114, cause visual comparison and classification platform 150 to perform one or more functions, as discussed below. Communication interface(s) 116 may include one or more wired and/or wireless network interfaces, and communication interface(s) 116 may connect visual comparison and classification platform 150 to one or more networks (e.g., network 190) and/or enable visual comparison and classification platform 150 to exchange information and/or otherwise communicate with one or more devices connected to such networks.

In one or more arrangements, memory(s) 115 may store and/or otherwise provide a plurality of modules (which may, e.g., include instructions that may be executed by processor(s) 114 to cause visual comparison and classification platform 150 to perform various functions) and/or databases (which may, e.g., store data used by visual comparison and classification platform 150 in performing various functions). For example, memory(s) 115 may store and/or otherwise provide visual comparison and classification module 115a, visual classification and comparison database 115b, and a machine learning engine 115c. In some instances, visual comparison and classification module 115a may store instructions that cause visual comparison and classification platform 150 to apply machine learning for phishing identification, and/or execute one or more other functions described herein. Additionally, visual classification and comparison database 115b may store data that is used by visual comparison and classification platform 150 in applying machine learning for phishing identification and/or in executing one or more other functions described herein. Furthermore, machine learning engine 115c may store instructions and/or data that may cause and/or be used by visual comparison and classification platform 150 to identify phishing websites, dynamically tune one or more thresholds used in phishing identification, and/or execute one or more other functions described herein. In one or more instances, the machine learning engine 115c may be or include a rule engine.

Cybersecurity server 160 may and/or include be one or more computing devices (e.g., servers, server blades, enterprise devices, or the like) that may be configured to maintain and preserve enterprise network security. Furthermore, the cybersecurity server 160 may be configured to access flags stored at URL classification platform 110, visual comparison and classification platform 150, and/or a central security repository, and may be configured to execute and/or otherwise perform one or more security measures based on detected flags.

Figure 2A:
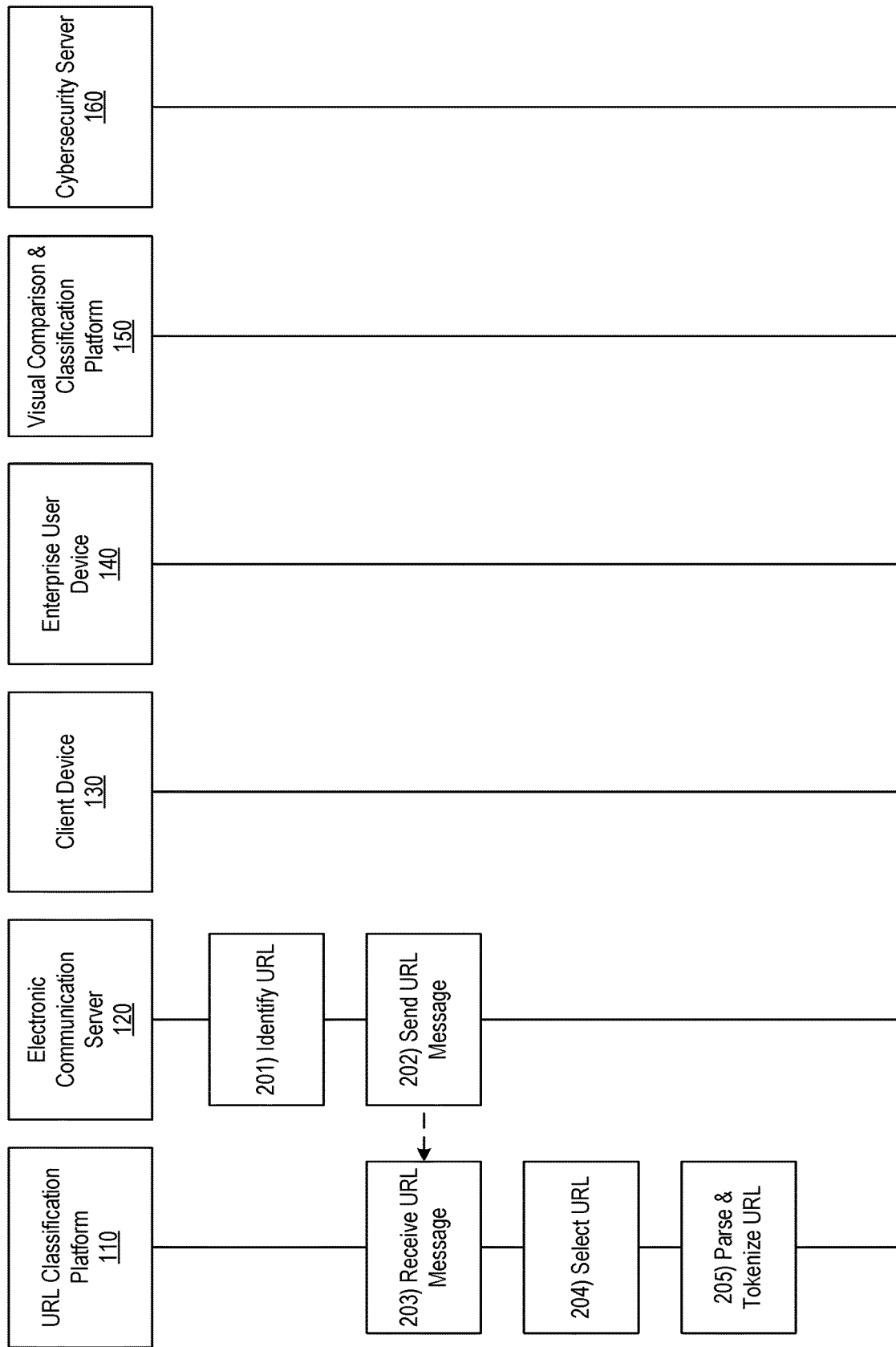
FIGS. 2A-2E depict an illustrative event sequence for detecting and identifying malicious sites using machine learning in accordance with one or more example embodiments.

FIGS. 2A-2E depict an illustrative event sequence for detecting and identifying malicious sites using machine learning in accordance with one or more example embodiments. Referring to FIG. 2A, at step 201, electronic communication server 120 may identify that a message includes one or more URLs. For example, the electronic communication server 120 may identify that an email is being sent from a first user account to a second user account, and that the email includes a particular URL. In some instances, the electronic communication server 120 may identify the URL using machine learning techniques, natural language processing, regular expressions, or the like. In some instances, the electronic communication server 120 may be configured to identify text that includes a particular feature (e.g., "https://," "www.," ".com," or the like) corresponding to a URL, and may identify the URL based on detecting the feature.

At step 202, the electronic communication server 120 may send, share, or otherwise provide a first message to the URL classification platform 110 that includes the one or more URLs identified at step 201. In some instances, in sending the first message, the electronic communication server 120 may send a copy of the message in which the one or more URLs were identified at step 201 (e.g., the email message, or the like). In other instances, the electronic communication server 120 may generate the first message, which may be a message containing the one or more URLs, but that might not contain additional text, such as additional text included in the message from step 201 (e.g., body text or the like).

At step 203, the URL classification platform 110 may receive or otherwise access the first message sent at step 203. For example, the URL classification platform 110 may receive a message that includes or otherwise identifies the one or more URLs identified at step 201. In some instances, in receiving the first message, the URL classification platform 110 may receive the message from which the one or more URLs were identified at step 201 (e.g., the email message, or the like). In other instances, the URL classification platform 110 may receive a message, generated by the electronic communication server 120, containing the one or more URLs, but that might not contain additional text included in the message from step 201 (e.g., body text or the like).

At step 204, the URL classification platform 110 may select a URL from the first message. For example, the URL classification platform 110 may select a first URL of the one or more URLs identified in the first message. In some instances, the URL classification platform 110 may select the first URL based on location within the first message (e.g., the URL is located first sequentially in the first message which may mean that the URL is also located first sequentially in the actual message in which the URL was identified at step 201), based on length of the URL (e.g., the shortest, the longest, or the like), and/or based on other factors. It should be understood that the URL classification platform 110 may ultimately perform the below described analysis on multiple URLs included in the first message (e.g., which may be a sequential or simultaneous analysis).

At step 205, the URL classification platform 110 may parse and/or tokenize the URL (e.g., the URL selected at step 204) to reduce the URL into a plurality of components. In one or more instances, the URL classification platform 110 may parse the URL to break the URL into components (e.g., substrings, or the like) according to the RFC 1738 specification. Additionally or alternatively, the URL classification platform 110 may tokenize the URL into components (e.g., substrings), which may produce components that do not relate to the RFC specification. In some instances, in performing this tokenization, the URL classification platform 110 may split the URL into a sequence of substrings containing a single character and/or multiple characters joined into larger wordparts, words, or the like. In these instances, the URL classification platform 110 may apply word part algorithms to train itself to accurately characterize URL strings (such as the URL) into atomic pieces (which may, e.g., ultimately be input into a classifier to identify whether or not the URL is malicious). Such atomic pieces may, for instance, include the protocol of the URL (e.g., "http://"), one or more subdomains and/or domains of the URL (e.g., "www," "Proofpoint," ".com," etc.), and/or other components extracted from the string of characters of the URL.

Figure 2B:
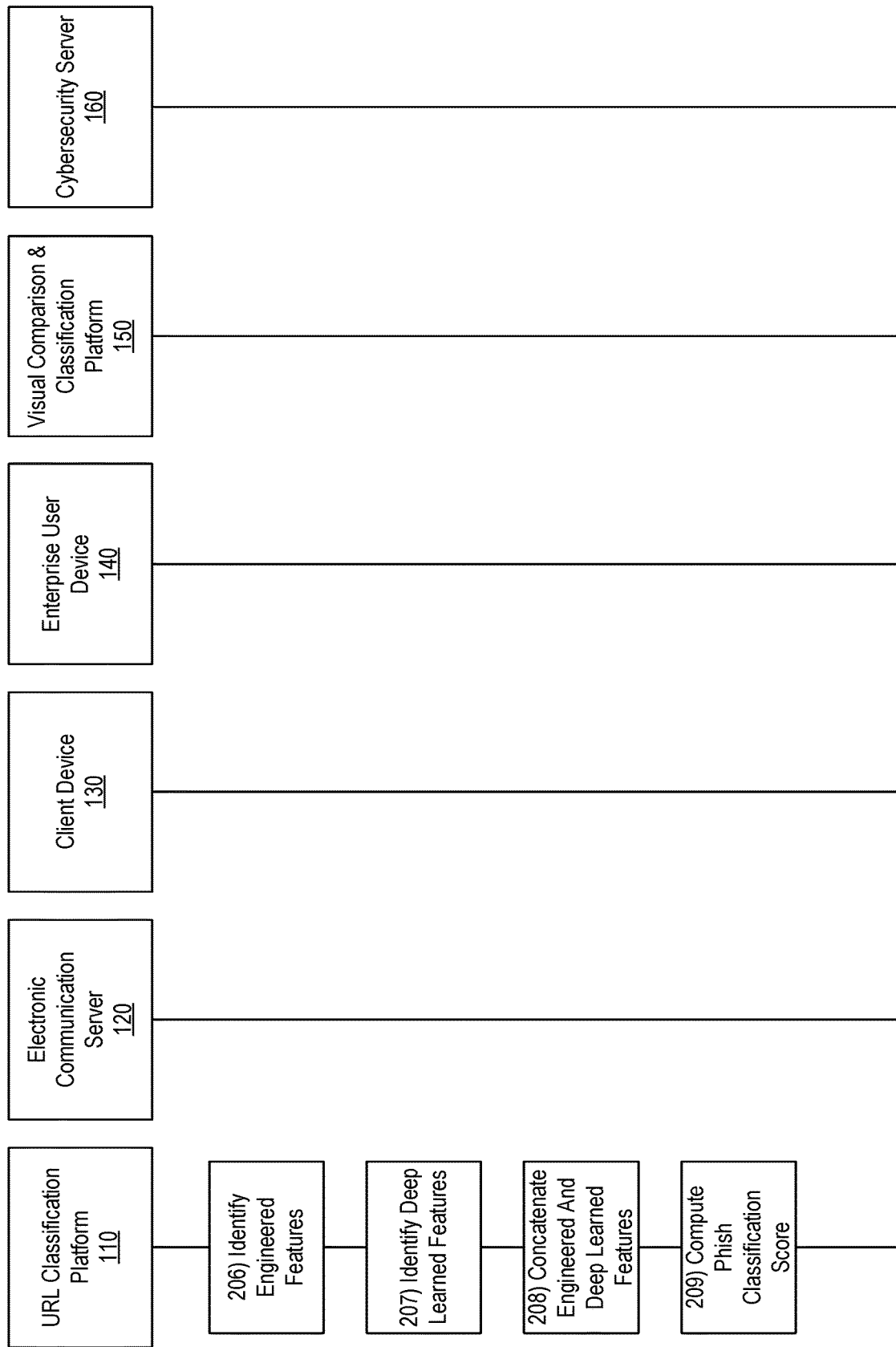

Referring to FIG. 2B, at step 206, the URL classification platform 110 may identify one or more human-engineered features of the URL. In one or more instances, the URL classification platform 110 may identify the one or more human-engineered features of the URL by applying feature extraction algorithms and/or scripts to the URL. In these instances, the URL classification platform 110 may identify human-engineered features indicative of malicious and/or legitimate websites. In some instances, the URL classification platform 110 might not identify a given URL as being malicious or legitimate based on any single human-engineered feature on its own, and rather may use a combination of features in making such a determination. For example, the URL classification platform 110 may apply a machine learning model to the human-engineered features to determine whether or not the identified human-engineered features, as a whole, indicate that the URL is legitimate or malicious.

In one or more instances, in identifying the one or more human-engineered features of the URL, the URL classification platform 110 may parse (e.g., according to the RFC 1738 specification) the URL to identify components of the URL. In doing so, the URL classification platform 110 may identify, for example, a protocol, a top level domain (TLD), a domain, a subdomain, a port, a port type, a path, path components, or the like included in the string of characters that makes up the URL (which may, e.g., also be referred to as "the URL string"). Additionally or alternatively, in identifying the one or more human-engineered features of the URL, the URL classification platform 110 may identify a popularity of the URL, a popularity of a domain of the URL, a popularity of a subdomain and a domain of the URL, a popularity of a subdomain, a domain, and one or more path components of the URL, or the like. In some instances, in identifying the popularity of the URL, a corresponding domain, a corresponding subdomain, and/or corresponding path components, the URL classification platform 110 may identify how many users have accessed the URL, the corresponding domain, the corresponding subdomain, and/or the corresponding path components within a predetermined period of time. Additionally or alternatively, in identifying the popularity of the URL, a corresponding domain, a corresponding subdomain, and/or corresponding path components, the URL classification platform 110 may identify a total number of hits the URL, domain, subdomain, and/or path components have received. Additionally or alternatively, in identifying the popularity of the URL, a corresponding domain, a corresponding subdomain, and/or corresponding path components, the URL classification platform 110 may identify a URL, domain, subdomain, and/or path component ranking based on a combination of total hits and number of users that requested access.

In some instances, in identifying the popularity of the URL, the URL classification platform 110 may access a table of correlations between URLs, domains, subdomains, path components, or the like and a popularity score indicating how frequently these URLs, domains, subdomains, path components, or the like are accessed within a predetermined period of time (e.g., today, this week, this month, or the like), a number of users who accessed these URLs, domains, subdomains, path components, or the like within a predetermined period of time, or the like. In some instances, the table of correlations may be locally or remotely stored, and may include proprietary and/or third party data corresponding to user access. In these instances, the URL classification platform 110 may apply a lookup function at the table of correlations to identify one or more popularity scores corresponding to the URL. In these instances, if the URL classification platform 110 identifies multiple popularity scores for the URL, the URL classification platform 110 may compute an average popularity score for the URL using the multiple popularity scores. In some instances, the popularity score(s) may be an indication of whether the URL corresponds to a malicious site or a legitimate site and/or may be a feature used by a classifier in determining whether the URL corresponds to a malicious site or a legitimate site (e.g., in combination with one or more other features). For example, if the URL classification platform 110 identifies that the URL has a low popularity score (e.g., below a predetermined popularity threshold), the URL classification platform 110 may determine that the URL may be malicious and/or the feature may be indicative of the URL being malicious. In contrast, if the URL classification platform 110 identifies that the URL has a high popularity score (e.g., above the predetermined popularity threshold), the URL classification platform 110 may determine that the URL is likely legitimate and/or the feature may be indicative of the URL being legitimate.

In some instances, in identifying the one or more human-engineered features of the URL, the URL classification platform 110 may identify one or more instances of brand mimicry. For example, in identifying the one or more instances of brand mimicry, the URL classification platform 110 may perform a string match to identify inclusion of brand names and key words in the URL. Additionally or alternatively, in identifying the one or more instances of brand mimicry, the URL classification platform 110 may identify an edit distance between the URL and other brand strings (and this edit distance may, e.g., correspond to how many modifications such as additions, deletions, replacements, or the like would need be made to make the URL string to make the URL string match or include the other brand strings). Additionally or alternatively, in identifying the one or more instances of brand mimicry, the URL classification platform 110 may identify phonetic distances between the URL and brand names (and such a phonetic distance may, e.g., represent whether and/or to what extent the URL string contain words or phrases that sounds like a brand). Additionally or alternatively, in identifying the one or more instances of brand mimicry, the URL classification platform 110 may perform visual processing using a computer vision system to identify whether and/or to what extent the URL string includes text that looks like a brand name, even if the characters do not match exactly (and this may, e.g., include looking for instances in which certain characters are swapped to appear visually similar to other characters, such as "cl" for "d," "1" for "l," or the like).

In one or more instances, in identifying the one or more human-engineered features, the URL classification platform 110 may identify that the URL contains a homoglyph, identify a character length of the URL, identify an encrypted protocol associated with the URL (e.g., https, or the like), identify a page extension of the URL, identify a signature associated with a domain generation algorithm, identify a presence of a random substring (e.g., identifying whether the URL contains text that appears to be randomly generated rather than manually created), identify a presence of one or more strings from a lexicon (which may, e.g., correspond to strings that correlate with being benign and/or strings that correlate with being malicious, such as suspicious strings that may be stored in a list of previously identified strings associated with suspicious items, such as string associated with prior known phish) in the URL, identify a number of subdomains of the URL, or the like.

In one or more instances, in identifying the one or more human-engineered features, the URL classification platform 110 may identify that the URL is a redirector (which may, e.g., be a URL that points to another URL). In these instances, the URL classification platform 110 may initiate one or more requests to capture a redirection chain of one or more URLs corresponding to redirection actions taken by each URL in the redirection chain (such as a chain of three URLs in which a first redirector URL points to a second redirector URL, which in turn points to a third URL). In some instances, in initiating the one or more requests to capture the chain of one or more URLs corresponding to the redirector, the URL classification platform 110 may send HTTP HEAD requests. In doing so, the URL classification platform 110 may capture common redirects (e.g., header redirects, or the like) and thus may capture the redirection chain of the one or more URLs corresponding to the redirection chain relatively quicker and/or more efficiently than if other substitute methods were used, thereby providing one or more technical advantages. Additionally or alternatively, the URL classification platform 110 may send HTTP GET requests, which may be more time consuming and/or computationally intensive than using HTTP HEAD requests in the method described above, but which may allow the URL classification platform 110 to execute JavaScript on a page corresponding to the URL and capture any JavaScript-based redirects accordingly. In some instances, this HTTP GET method may be more comprehensive than the HTTP HEAD method, and so a tradeoff may be made between thoroughness and computational efficiency when configuring the URL classification platform 110. In some instances, after capturing the chain of one or more URLs corresponding to the redirector, the URL classification platform 110 may perform analysis (e.g., using one or more of the analysis techniques described herein, such as the URL string analysis technique described herein) of all the URLs included in the captured chain corresponding to the redirector. Alternatively, the URL classification platform 110 may perform such analysis of only a single URL in the captured chain corresponding to the redirector, such as the last URL in the chain (which may, e.g., be a page on which a user would eventually land and thus the page where the user would encounter the greatest cybersecurity risk).

At step 207, the URL classification platform 110 may identify one or more deep learned features of the URL. In one or more instances, in identifying the one or more deep learned features of the URL, the URL classification platform 110 may compute a vector representation of the URL. In some instances, the URL classification platform 110 may compute the vector representation of the URL using a neural network (e.g., a recurrent neural network, convolutional neural network, transformer neural network, or the like). For instance, the URL classification platform 110 may input the URL string into the neural network, which may process the URL string through various layers associated with the neural network and then output the vector representation of the URL. In some instances in which a neural network is used to compute the vector representation of one or more URLs, the URL classification platform 110 may pre-train the neural network by using one or more language modeling tasks, other self-supervised tasks, or the like. For example, the URL classification platform 110 may pre-train the neural network by executing a masked word part prediction on a set of URLs, prior to inputting the URL into the neural network, so as to optimize the ability of the neural network to understand the structure, form, and/or other features of URLs.

At step 208, the URL classification platform 110 may concatenate the one or more human-engineered features of the URL (identified at step 206) to the one or more deep learned features of the URL (identified at step 207). In doing so, the URL classification platform 110 may generate a concatenated vector representation of the URL. The concatenated vector representation of the URL may, for example, be an overall numeric representation of the URL that can be fed into a classification layer or other classifier model, as illustrated below.

At step 209, the URL classification platform 110 may input the concatenated vector representation of the URL to a URL classifier to compute a first phish classification score. In one or more instances, in inputting the concatenated vector representation of the URL to the URL classifier, the URL classification platform 110 may input the concatenated vector representation into a neural network (which may, e.g., be configured to classify the URL by outputting the phish classification score representing the degree to which the URL is likely legitimate or likely malicious). In instances in which a neural network is used as the classifier for computing the phish classification score, the URL classification platform 110 thus may implement end-to-end learning (e.g., because the classifier may operate on other features determined by a neural network, namely, the deep learned features), and this end-to-end learning may provide one or more technical advantages such as computational efficiency in phish classification score calculation. In some instances, in inputting the concatenated vector representation of the URL into the URL classifier, the URL classification platform 110 may input the concatenated vector representation into another type of classifier (e.g., different from a neural network) such as a random forest model, support vector machine model, gradient boosted decision tree model, fully connected neural network, or the like.

In some instances, the URL classification platform 110 may compare the first phish classification score to a predetermined phish classification threshold. In these instances, if the URL classification platform 110 determines that the first phish classification score exceeds the predetermined phish classification threshold, the URL classification platform 110 may send an output message (e.g., to electronic communication server 120, client device 130, enterprise user device 140, visual comparison and classification platform 150, and/or cybersecurity server 160) indicating that the selected URL is likely malicious. In some instances, if the URL classification platform 110 determines that the first phish classification score exceeds the predetermined phish classification threshold, the URL classification platform 110 may generate and send one or more commands directing client device 130 and/or enterprise user device 140 to cause display of a user interface, alert, or the like indicating that the URL is a phish or otherwise malicious. Additionally or alternatively, if the URL classification platform 110 determines that the first phish classification score exceeds the predetermined phish classification threshold, the URL classification platform 110 may generate and send one or more commands directing the visual comparison and classification platform 150 and/or the cybersecurity server 160 to classify the selected URL as likely malicious (which may, e.g., result in access to the URL being denied and/or otherwise prevented). Additionally or alternatively, if the URL classification platform 110 determines that the first phish classification score exceeds the predetermined phish classification threshold, the URL classification platform 110 may generate and send one or more commands directing another classification platform to apply one or more additional classification algorithms to the selected URL, such as a visual classification performed by visual comparison and classification platform 150, as discussed in greater detail below, and/or a holistic classification performed by another classification platform. Alternatively, if the URL classification platform 110 determines that the first phish classification score does not exceed the predetermined phish classification threshold, the URL classification platform 110 may treat the URL as likely legitimate (which may, e.g., include allowing and/or otherwise enabling access to the URL).

In one or more instances, the URL classification platform 110 may compare the first phish classification score to multiple phish classification thresholds (e.g., a first phish classification threshold and a second phish classification threshold, which may be higher than the first phish classification threshold). In these instances, the URL classification platform 110 may perform one or more of the actions described above (e.g., generating/sending commands to cause display of alerts, deny/prevent access, trigger additional classification/analysis, or the like) in response to determining that the first phish classification score exceeds the first phish classification threshold but not the second phish classification threshold. If the URL classification platform 110 determines that the first phish classification score exceeds both the first and the second predetermined phish classification thresholds, the URL classification platform 110 may determine that the selected URL is likely malicious and may proceed accordingly (e.g., send notifications, set flags, or the like) without routing the selected URL (e.g., to the visual comparison and classification platform 150 and/or another classification platform) for further analysis. If the URL classification platform 110 determines that the first phish classification score does not exceed either the first or the second predetermined phish classification thresholds, the URL classification platform 110 may determine that the selected URL is likely legitimate and may proceed accordingly (e.g., generating/sending commands to allow/enable access to the URL, send notifications indicating the URL is legitimate, refrain from routing the URL to the visual comparison and classification platform 150 for further analysis, or the like).

Figure 2C:
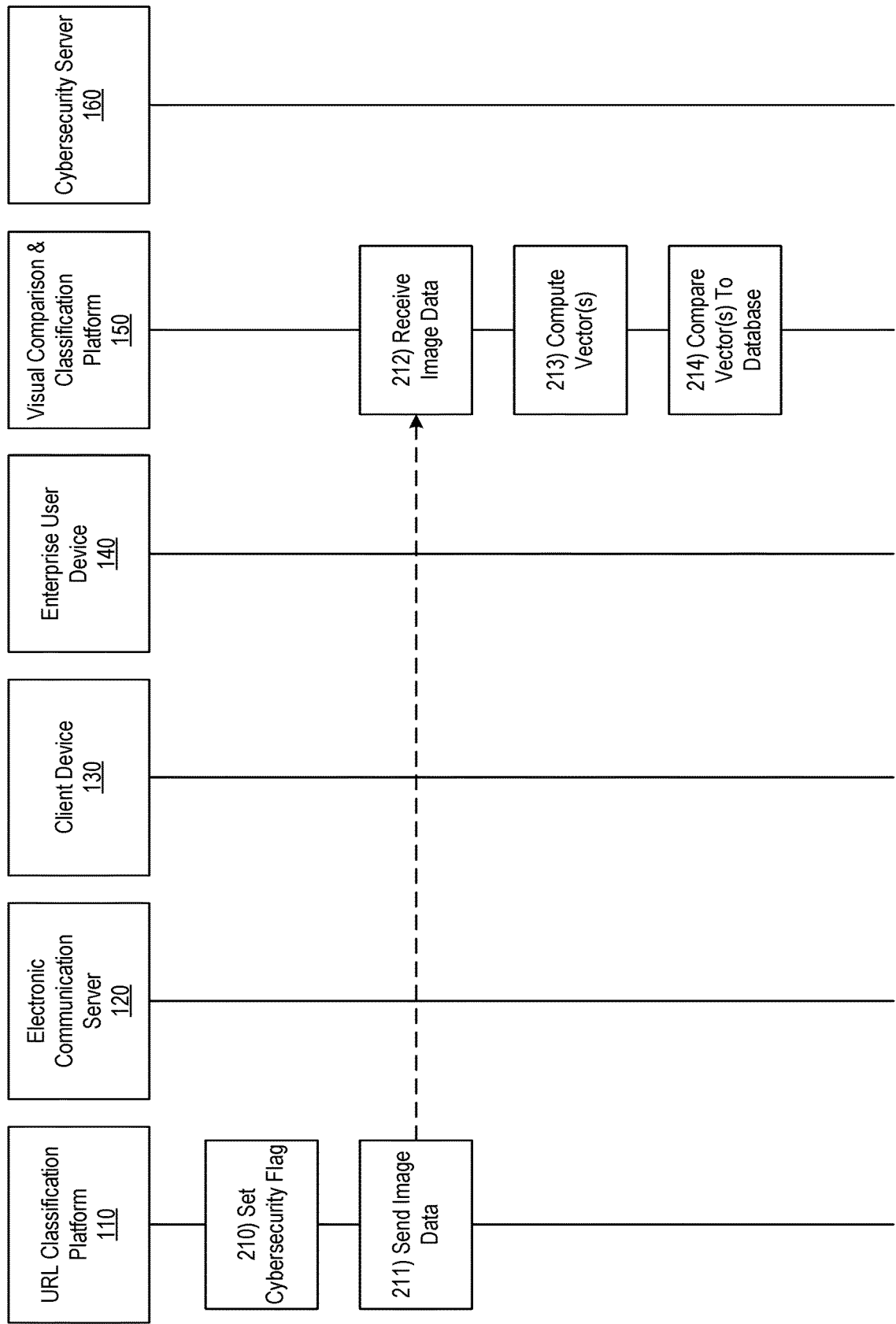

Referring to FIG. 2C, at step 210, based on the comparison of the first phish classification score to the one or more predetermined phish classification thresholds, the URL classification platform 110 may set one or more flags (e.g., locally and/or at a central repository) that may be accessible by the cybersecurity server. In some instances, the URL classification platform 110 may set a first flag if the first phish classification score exceeds a first phish classification threshold and a second flag if the first phish classification score exceeds a second phish classification threshold (which may, e.g., cause performance of different cybersecurity actions). It should be understood, however, that any number of phish classification thresholds may be applied by the URL classification platform 110. In one or more instances, by setting the one or more flags, the URL classification platform 110 may cause the cybersecurity server 160 to perform one or more security actions and/or otherwise implement one or more security measures (e.g., as described below with regard to steps 219-223).

At step 211, the URL classification platform 110 may send, share, or otherwise provide image data corresponding to the URL to the visual comparison and classification platform 150. In some instances, the URL classification platform 110 may send the URL to the visual comparison and classification platform 150 without the image data, and the visual comparison and classification platform 150 may access the URL to collect the image data. In one or more instances, the URL classification platform 110 may send the image data if the first phish classification score is between the first phish classification threshold and the second phish classification threshold (e.g., as described above at step 209), and might not send the image data if the first phish classification score is outside of a range defined by the first phish classification threshold and the second phish classification threshold. In doing so, the URL classification platform 110 may conserve network bandwidth and computing resources by filtering out URLs already identified as malicious or legitimate prior to subjecting these URLs to further analysis (e.g., by the visual comparison and classification platform 150), thereby providing various technical advantages over conventional approaches to identifying malicious links. It should be understood that, in some instances, the URL classification platform 110 might not send the image data to the visual comparison and classification platform 150. Rather, in these instances, the visual comparison and classification platform 150 may access the image data independently of the URL classification platform 110. Accordingly, it should be understood that the actions of the URL classification platform 110 and/or visual comparison and classification platform 150 may, in some instances, occur independently of each other without reliance on analysis and/or other methods performed by the other. Similarly it should be understood that the below described analysis performed by the visual comparison and classification platform 150 may, in some instances, occur prior to the analysis by the URL classification platform 110 (which is described above)

At step 212, the visual comparison and classification platform 150 may receive or otherwise access the image data corresponding to the URL from the URL classification platform 110. In some instances, the visual comparison and classification platform 150 may receive the URL without the image data, and may access the URL (e.g., a page corresponding to the URL) to collect the image data, receive the image data from the cybersecurity server 160, or otherwise access the image data. In some instances, in receiving the image data, the visual comparison and classification platform 150 may receive image data of a graphical rendering of a resource available at the URL.

At step 213, the visual comparison and classification platform 150 may compute a computer vision vector representation of the image data received at step 212. In one or more instances, in computing the computer vision vector representation of the image data, the visual comparison and classification platform 150 may pass the image data through one or more layers of a convolutional neural network (e.g., including a representation layer). For example, the visual comparison and classification platform 150 may compute a computer vision vector representation of the image data using deep learning. In these instances, the visual comparison and classification platform 150 may pass the image data through a convolutional neural network that outputs and/or otherwise produces the computer vision vector representation of the image data (e.g., as a result of the image data being passed through and/or otherwise processed by the layers of the convolutional neural network). In these instances, prior to using the convolutional neural network to compute the computer vision vector representation of the image data at step 213, the visual comparison and classification platform 150 may train the convolutional neural network using metric learning, which may enable the visual comparison and classification platform 150 to tune, optimize, and/or update the convolutional neural network for image comparison tasks. In one or more instances, the visual comparison and classification platform 150 may further compute the computer vision vector representation of the image data using a trained attention mechanism, which may allow the visual comparison and classification platform 150 to include salient regions of the image data and exclude unnecessary and/or distracting portions of the image data in the computation of the computer vision vector representation of the image data.

At step 214, the visual comparison and classification platform 150 may compare the computer vision vector representation of the image data to one or more stored numeric vectors representing page elements. In some instances, prior to comparing the computer vision vector representation of the image data to the one or more stored numeric vectors representing page elements, the visual comparison and classification platform 150 may use a hash table lookup function to determine whether an exact match exists between the image data and a specific page element (e.g., without using the computer vision vector representation of the image data or the one or more stored numeric vectors representing page elements). In doing so, the visual comparison and classification platform 150 may perform this relatively quick matching function prior to performing more computationally intensive and/or inexact matching (e.g., using a nearest neighbor search, radius search, or the like), comparing, or the like (e.g., if an exact match is identified, the visual comparison and classification platform 150 does not need to move to the more computationally intensive matching) and thus optimize computing resource consumption, thereby providing one or more technical advantages.

In some instances, in comparing the computer vision vector representation of the image data to the one or more stored numeric vectors representing page elements, the visual comparison and classification platform 150 may compare the computer vision vector representation of the image data to one or more stored numeric vectors stored in a screenshot database. For example, prior to comparing the computer vision vector representation of the image data to the one or more stored numeric vectors representing page elements and/or prior to the visual similarity classification process being initiated, the visual comparison and classification platform 150 may generate a screenshot database that includes images of one or more URLs and their corresponding image data (which may, e.g., be a screenshot of a whole page, visual elements of a page, or the like). In generating the screenshot database, the visual comparison and classification platform 150 may select the one or more URLs for inclusion in the screenshot database based on previous attacks corresponding to the one or more URLs, anticipated attacks corresponding to the one or more URLs, URL popularity, or the like. In addition, in generating the screenshot database, the visual comparison and classification platform 150 may include screenshots captured from internal websites (which may, e.g., be associated with an enterprise organization operating the visual comparison and classification platform 150 and/or cybersecurity server 160) and/or external websites (which might, e.g., not be associated with the enterprise organization operating the visual comparison and classification platform 150 and/or cybersecurity server 160).

In some instances, the visual comparison and classification platform 150 may update the screenshot database (e.g., asynchronously, at a predetermined interval, or the like). In these instances, the visual comparison and classification platform 150 may identify that a page image corresponding to a URL of the one or more URLs has changed, and a previous page image corresponding to the URL of the one or more URLs may have been stored in the screenshot database. In these instances, in response to determining that the page image corresponding to a URL of the plurality of URLs has changed, the visual comparison and classification platform 150 may capture the page image corresponding to the URL of the one or more URLs, and may add the captured page image to the screenshot database. In some instances, the visual comparison and classification platform 150 may automatically update the screenshot database. Additionally or alternatively, the screenshot database may be manually updated (e.g., screenshots of known phish may be manually uploaded to the screenshot database by a cybersecurity analyst or the like). In instances where the screenshot database is manually updated, a cybersecurity analyst may access a software tool (e.g., via the enterprise user device 140, or the like), which may be hosted by the visual comparison and classification platform 150, to provide insight regarding impact of adding new images, screenshots, or the like to the screenshot database.

In one or more instances, in generating this screenshot database, the visual comparison and classification platform 150 may compute, for each URL in the screenshot database, a computer vision vector representation of image data corresponding to the URL (e.g., using a convolutional neural network as described above with regard to step 213). In these instances, the visual comparison and classification platform 150 may store, for each URL in the screenshot database, corresponding images and vector representations computed from the images.

As a result of the comparison performed at step 214, the visual comparison and classification platform 150 may generate and/or output a feature indicating whether and/or to what extent the computer vision vector representation of the image data is visually similar to a known page element (e.g., a screenshot of a rendered page, logo, login form, or the like).

Figure 2D:
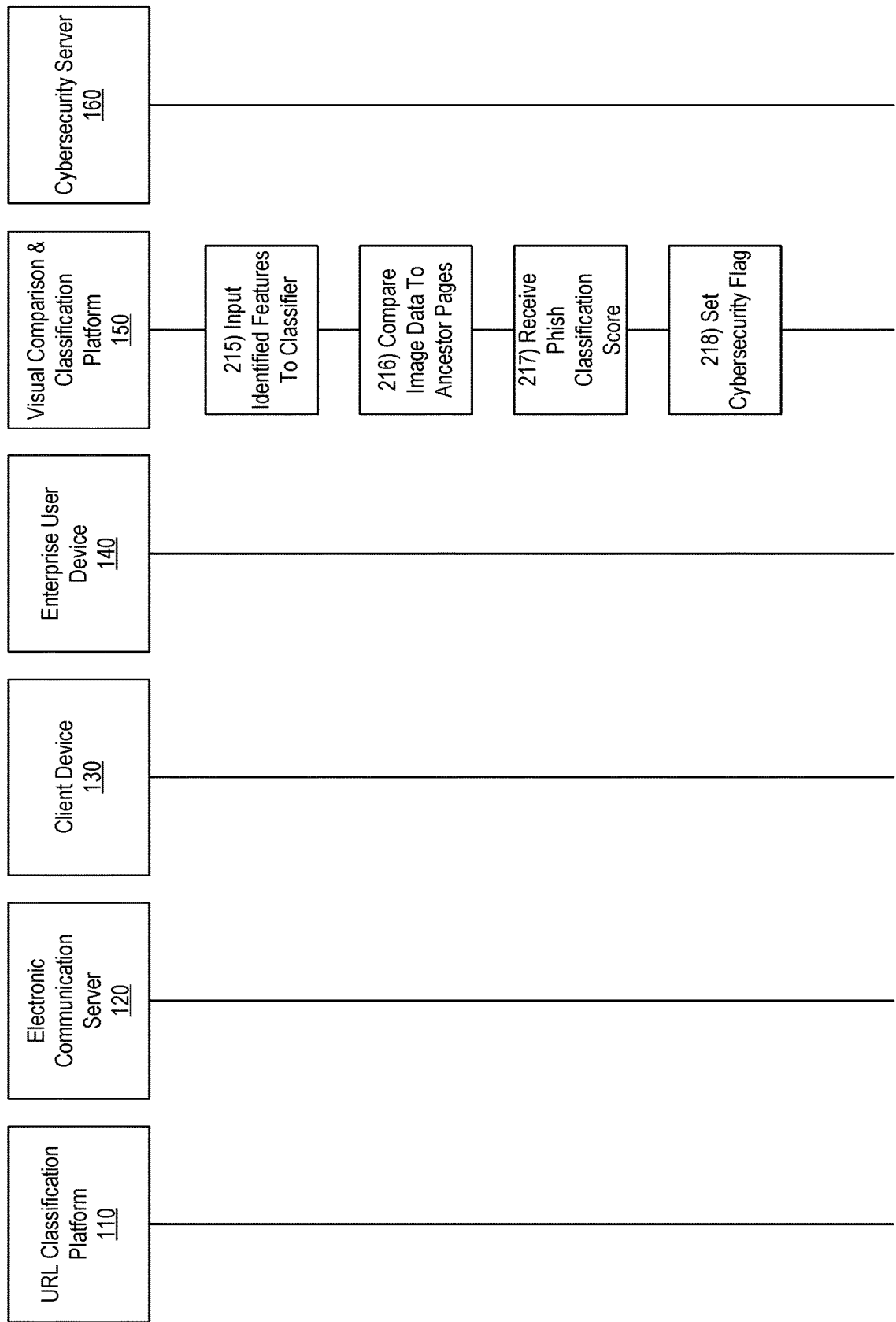

Referring to FIG. 2D, at step 215, the visual comparison and classification platform 150 may input, into a classifier, the feature indicating whether and/or to what extent the computer vision vector representation of the image data is visually similar to the known page element. For example, the visual comparison and classification platform 150 may input this feature into a machine learning classifier, rule based classifier, or the like. The classifier may, for instance, process the feature indicating whether and/or to what extent the computer vision vector representation of the image data is visually similar to the known page element in combination with one or more other features by applying one or more machine learning models and may output a numerical classification score, as illustrated below. It should be understood that the classifier is not limited to using visual similarity as an input and may utilize other features and/or evidence to compute the numerical classification score.

At step 216, in addition to or as an alternative to the methods described above at steps 213-215, the visual comparison and classification platform 150 may compare the image data to one or more ancestor pages of the URL (e.g., root page, parent page(s), other intermediate pages between the root page and parent page(s), or the like). For example, one or more of the methods described at step 217 may be performed simultaneously with, in lieu of, or sequentially before or after one or more of the methods described at steps 213-215. For example, in comparing the image data to one or more ancestor pages of the URL (e.g., instead of and/or in addition to using the vectors and screenshot database as described above), the visual comparison and classification platform 150 may compare the image data received at step 212 with image data captured from one or more ancestor pages of the URL, such as the URL's parent page(s), root page, intermediate pages between the parent page and the root page, or the like. Such image data may, for instance, be captured by the visual comparison and classification platform 150 by visiting and/or rendering the URL's parent page(s), root page, intermediary pages, or the like. In some instances, in comparing the image data received at step 212 with the image data captured from one or more ancestor pages of the URL, the visual comparison and classification platform 150 may compare color histograms, perform object detection and/or matching, and/or use other techniques to identify similarities between the image data received at step 212 and the image data captured from one or more ancestor pages of the URL. In addition, when performing such a comparison, the visual comparison and classification platform 150 may look for and/or identify the presence of specific page elements in the image data received at step 212 and corresponding page elements in the one or more ancestor pages, as the presence of similar, corresponding page elements (rather than an exact match between the page corresponding to the URL and its ancestor page(s) may indicate that the URL is likely legitimate within this ancestor visual similarity analysis process.

In some instances, to perform the above described page element comparison, the visual comparison and classification platform 150 may generate an object list that includes identified page elements for each of the one or more ancestor pages. In these instances, the visual comparison and classification platform 150 may then apply object detection to the image data captured from the URL to identify objects that are included in the image data (e.g., logos, brand graphics, login panes, logo aspect ratios, background images, or the like), and may compare the objects identified as being included in the image data with the object list representative of the one or more ancestor pages.

In some instances, prior to applying object detection to the image data captured from the URL to identify objects included in the image data, the visual comparison and classification platform 150 may analyze one or more message attachments (e.g., included in the message received at step 203, the message that included the original URL at step 201, or the like) to identify objects included in the one or more message attachments. In response to identifying these included objects in the one or more message attachments, the visual comparison and classification platform 150 may, for instance, determine that object detection should not be performed on the graphical rendering of the resource available at the URL (e.g., the image data of the URL), and may compare the objects included in the one or more message attachments to the object list.

In some instances, the visual comparison and classification platform 150 may compare the image data captured from the URL to the image data captured from the one or more ancestor pages by performing a visual comparison (e.g., a color analysis, a deep learning vector comparison, a logo comparison, optical character comparison, or the like) between the image data captured from the URL and the image data captured from the one or more ancestor pages. Additionally or alternatively, the visual comparison and classification platform 150 may perform a non-visual comparison of the URL and its ancestor page(s), such as a comparison of code, markup, text, or the like captured from the URL and code, markup, text, or the like captured from the one or more ancestor pages.

In some instances, based on the comparison of the image data captured from the URL and the image data captured from the one or more ancestor pages, the visual comparison and classification platform 150 may generate an ancestor similarity score. For example, the visual comparison and classification platform 150 may feed results of the ancestor page comparison described herein (e.g., matching features, similarity features, or the like) into a downstream classifier, which may, in some instances, be the same classifier into which the visual similarity feature is input at step 215 or a different classifier (e.g., a holistic classifier, or the like). In performing this comparison between the image data captured from the URL and the image data captured from the one or more ancestor pages of the URL, the visual comparison and classification platform 150 may identify phish pages, hacks, or the like that may be deployed to existing or otherwise legitimate websites.

At step 217, the visual comparison and classification platform 150 may receive, from the classifier, a phish classification score, which may indicate a likelihood that the URL is malicious. In some instances, the phish classification score may be based on the vector comparison described in steps 213-215 and/or the ancestor page comparison described at step 216. In some embodiments, the visual comparison and classification platform 150 may compare the second phish classification score to a predetermined phish classification threshold (which may, e.g., be the same or different than the predetermined phish classification thresholds described above with respect to step 209). If the visual comparison and classification platform 150 determines that the second phish classification score exceeds the predetermined phish classification threshold, the visual comparison and classification platform 150 may send a message (e.g., to electronic communication server 120, client device 130, enterprise user device 140, and/or cybersecurity server 160) indicating that the selected URL is likely malicious. In some instances, if the visual comparison and classification platform 150 determines that the second phish classification score exceeds the predetermined phish classification threshold, the visual comparison and classification platform 150 may generate and send one or more commands directing client device 130 and/or enterprise user device 140 to cause display of a user interface, alerts, or the like indicating that the selected URL is a phish. Additionally or alternatively, if the visual comparison and classification platform 150 determines that the second phish classification score exceeds the predetermined phish classification threshold, the visual comparison and classification platform 150 may generate and send one or more commands directing another classification platform to apply one or more additional classification models and/or other analysis methods to content (e.g., HTML, JavaScript, images, or the like) of the selected URL, such as a holistic classification model (e.g., that performs a holistic analysis of the URL and/or corresponding content for phish analysis) hosted on and/or otherwise provided by another classification platform.

In some embodiments, the visual comparison and classification platform 150 may compare the second phish classification score to multiple phish classification thresholds (e.g., a first phish classification threshold and a second phish classification threshold, higher than the first phish classification threshold). In one or more arrangements, the first phish classification threshold and the second phish classification threshold used by the visual comparison and classification platform 150 may be similar to the first phish classification threshold and the second phish classification threshold used by the URL classification platform 110. In these instances, the visual comparison and classification platform 150 may perform one or more of the actions described above in response to determining that the second phish classification score exceeds the first phish classification threshold but not the second phish classification threshold (e.g., the visual comparison and classification platform 150 may send the URL to another classification model and/or computing platform for content (HTML, JavaScript, images, or the like) analysis, such as a holistic site classification model hosted on another computing platform). If the visual comparison and classification platform 150 determines that the second phish classification score exceeds both the first and the second predetermined phish classification thresholds, the visual comparison and classification platform 150 may determine that the selected URL is likely malicious and may proceed accordingly (e.g., send alerts/notifications, set flags, deny/prevent access, or the like) without routing the URL (e.g., to another classification platform or other system) for further analysis. If the visual comparison and classification platform 150 determines that the second phish classification score does not exceed either the first or the second predetermined phish classification thresholds, the visual comparison and classification platform 150 may determine that the selected URL is likely legitimate and may proceed accordingly (e.g., send notifications, allow/enable access to the URL, or the like) without routing the URL for further analysis.

At step 218, based on the comparison of the phish classification score(s) to the one or more predetermined phish classification thresholds, the visual comparison and classification platform 150 may set one or more flags (e.g., locally and/or at a central repository, such as in a database maintained by the cybersecurity server 160) that may be accessible by the cybersecurity server 160. In some instances, the visual comparison and classification platform 150 may set a first flag if the first phish classification score and/or the second phish classification score exceeds a first phish classification threshold and a second flag if the first phish classification score and/or the second phish classification score exceeds a second phish classification threshold (which may, e.g., cause performance of different cybersecurity actions). In some instances, other numbers of phish classification thresholds may similarly be applied by the visual comparison and classification platform 150 to cause different cybersecurity actions.

In one or more instances, by setting the one or more flags, the visual comparison and classification platform 150 may cause the cybersecurity server 160 to perform one or more specific security measures in accordance with the flags that are set by the visual comparison and classification platform 150 (e.g., as described below with regard to steps 219-223). In some instances, after completing processing of the selected URL, one or more of the methods described herein may return to step 204 in which a subsequent URL may be selected for processing (e.g., by the URL classification platform 110). In some instances, processing of multiple URLs may occur simultaneously (e.g., the URL classification platform 110 and/or the visual comparison and classification platform 150 may process multiple different URLs simultaneously by executing one or more of the steps of the example event sequence discussed herein in a substantially contemporaneous manner with respect to different URLs).

Figure 2E:
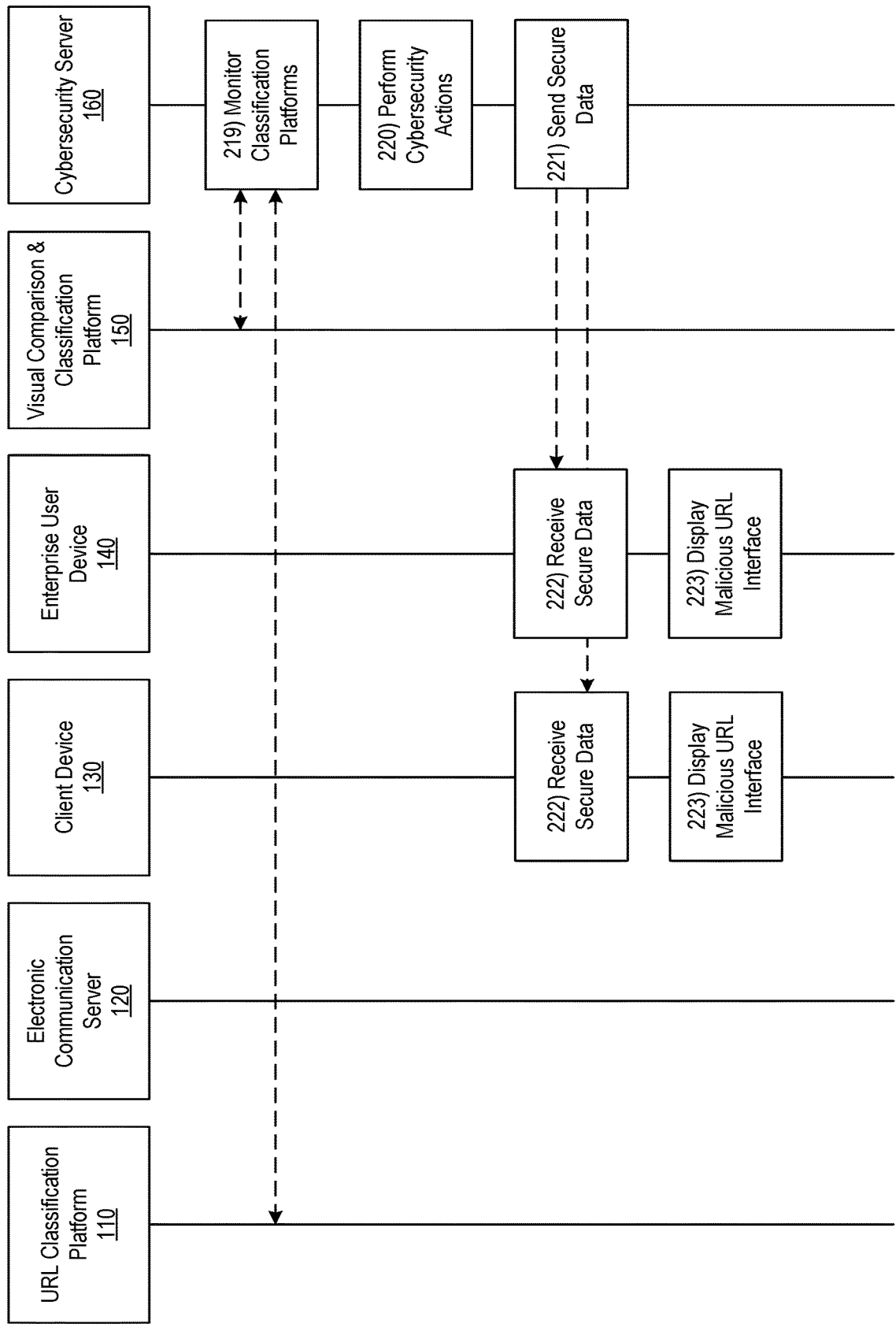

Referring to FIG. 2E, at step 219, the cybersecurity server 160 may monitor the URL classification platform 110, the visual comparison and classification platform 150, the central repository (which may, e.g., be a database, message, queue, or the like maintained by the cybersecurity server 160), and/or any other platforms and/or databases to which classifiers used to analyze various URLs, including the URL identified at step 201, may write flags and/or output classification results, so as to detect whether any cybersecurity flags have been set with respect to various URLs, including the URL identified at step 201. In some instances, the cybersecurity server 160 may check and/or otherwise monitor for the flags at a predetermined interval. In some instances, this interval may, for example, be set by a network administrator, one or more cybersecurity analysts, or other enterprise employees. In other instances, this interval may be learned and/or otherwise automatically determined by the cybersecurity server 160 (e.g., based on pattern data, historical usage data, or the like). If the cybersecurity server does detect a flag, the cybersecurity server 160 may proceed to step 220 to perform one or more cybersecurity actions accordingly. If the cybersecurity server 160 fails to detect a flag, the cybersecurity server 160 may determine that the phish classification scores do not exceed at least one phish classification threshold (e.g., as determined by the URL classification platform 110, visual comparison and classification platform 150, and/or other classification platforms), and thus may allow access to certain URLs (e.g., without performing cybersecurity actions, based on such URLs being treated as legitimate).

At step 220, the cybersecurity server 160 may perform one or more cybersecurity actions based on the detected flags. For example, in performing the one or more cybersecurity actions based on the detected flags, the cybersecurity server 160 may block the URL identified at step 201 (e.g., by denying requests received from one or more user computing devices, such as client device 130 and/or enterprise user device 140, to access the URL, and/or by otherwise preventing access to the URL through URL rewriting, or the like). Additionally or alternatively, the cybersecurity server 160 may subject content (e.g., html, JavaScript, images, or the like) of the URL to additional analysis and/or monitoring (e.g., by commanding and/or controlling URL classification platform 110, visual comparison and classification platform 150, a holistic classification platform (e.g., that performs a holistic evaluation of the URL and corresponding content for phish identification using various machine learning techniques and/or a comprehensive analysis of content captured from and/or features associated with the URL), and/or one or more other analysis platforms to execute such additional analysis and/or monitoring), and/or may generate and send one or more cybersecurity alerts (e.g., to one or more user devices linked to network administrators and/or cybersecurity analysts). In some instances, in performing the one or more cybersecurity actions based on the detected flags, the cybersecurity server 160 may perform different actions depending on which flags have been set, such as flags set by the URL classification platform 110, the visual comparison and classification platform 150, and/or one or more other analysis platforms (e.g., a holistic classifier, or the like) and/or depending on which flags have been detected (e.g., by the cybersecurity server 160 at step 219). For example, in performing the one or more cybersecurity actions based on the detected flags, the cybersecurity server 160 may perform a first action in response to detecting a first flag and a second action in response to detecting a second flag. In some instances, other numbers of flags may similarly be used by the cybersecurity server 160 to cause different cybersecurity actions.

At step 221, the cybersecurity server 160 may generate and send, share, or otherwise provide secure data to the client device 130 and/or enterprise user device 140. For example, the cyber security server 160 may send a rewritten URL (e.g., that points to the cybersecurity server 160). Additionally or alternatively, the cyber security server 160 may send one or more commands directing the client device 130 and/or the enterprise user device 140 to display a malicious URL interface (e.g., based on detecting particular flags at step 219 and determining to display such an interface as a cybersecurity action at step 220). For example, the cybersecurity server 160 may generate the one or more commands directing the client device 130 and/or enterprise user device 140 to display the malicious URL interface in response to detecting a particular flag at step 219 and determining to perform a particular action at step 220. In some instances, in generating the one or more commands directing the client device 130 and/or enterprise user device 140 to display the malicious URL interface, the cybersecurity server 160 may generate malicious URL interface information that may be used by the client device 130 and/or enterprise user device 140 to present the malicious URL interface. In other instances, the cybersecurity server 160 may generate the malicious URL interface itself and may send the generated interface to the client device 130 and/or enterprise user device 140 for display.

At step 222, the client device 130 and/or enterprise user device 140 may receive or otherwise access the secure data sent at step 221. For example, the client device 130 and/or enterprise user device 140 may receive a rewritten URL (e.g., that points to the cybersecurity server 160). Additionally or alternatively, the client device 130 and/or the enterprise user device 140 may receive one or more commands directing the client device 130 and/or enterprise user device 140 to display the malicious URL interface. In some instances, along with the one or more commands directing the client device 130 and/or enterprise user device 140 to display the malicious URL interface, the client device 130 and/or enterprise user device 140 may receive the malicious URL interface itself or malicious URL interface information that may be used to generate the malicious URL interface.

Figure 3:
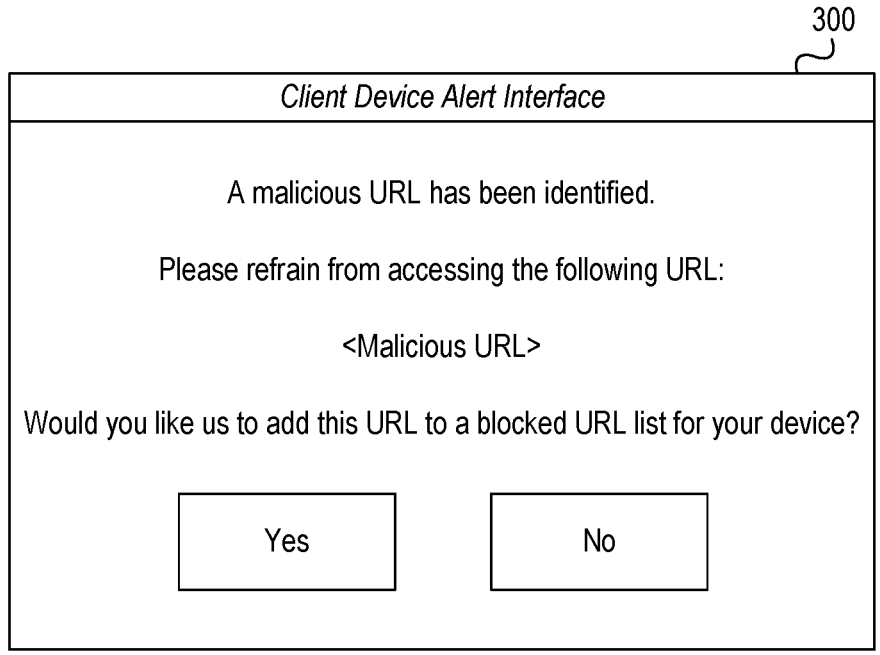
FIGS. 3 and 4 depict illustrative user interfaces for detecting and identifying malicious sites using machine learning in accordance with one or more example embodiments.
Figure 4:
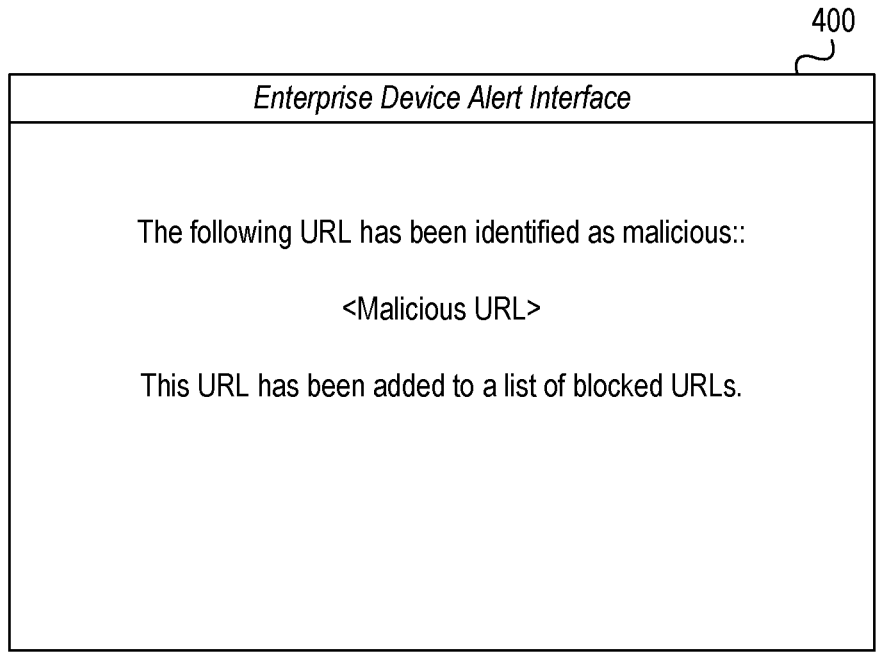

At step 223, the client device 130 and/or enterprise user device 140 may display a malicious URL interface. In some instances, the client device 130 and/or the enterprise user device 140 may display the malicious URL interface by accessing the malicious URL interface from the cybersecurity server 160 (e.g., in response to receiving a user input corresponding to selection of the rewritten URL). In some instances, the client device 130 and/or enterprise user device 140 may display the malicious URL interface in response to receiving the one or more commands directing the client device 130 and/or enterprise user device 140 to display the malicious URL interface. In some instances, in displaying the malicious URL interface, the client device 130 may display a graphical user interface similar to graphical user interface 300, which is shown in FIG. 3. For example, in displaying the malicious URL interface, the client device 130 may display a particular URL that has been flagged by the cybersecurity server 160 (e.g., based on analysis performed by the URL classification platform 110 and/or the visual comparison and classification platform 150) and may present additional options to a user of the client device 130 (e.g., to add the URL to a blocked URL list, or the like). In some instances, in displaying the malicious URL interface, the enterprise user device 140 may display a graphical user interface similar to graphical user interface 400, which is shown in FIG. 4. For example, the enterprise user device 140 may display an interface indicating that the URL has been added to a list of blocked URLs (e.g., on an enterprise network, or the like).

It should be understood that the steps described in the illustrative event sequence herein may be performed in any alternative sequence or order without departing from the scope of the disclosure. Furthermore, although a single client device and enterprise user device are described, it should be understood that any number of devices may be involved in the methods described herein.

The steps shown in the example event sequence above are included for illustrative purposes to show a particular use case for identifying a malicious site. In some arrangements, however, steps 212-218 may be performed in lieu of or prior to steps 203-211 (and, e.g., in these instances, steps 203 and 204 may be performed by the visual comparison and classification platform 150 in a similar manner as described above). Similarly, in some arrangements, steps 203-211 may be performed without triggering performance of steps 212-218 (e.g., classification by either URL classification platform 110 or visual comparison and classification platform 150 may, in some instances, occur without classification by the other).

Figure 5:
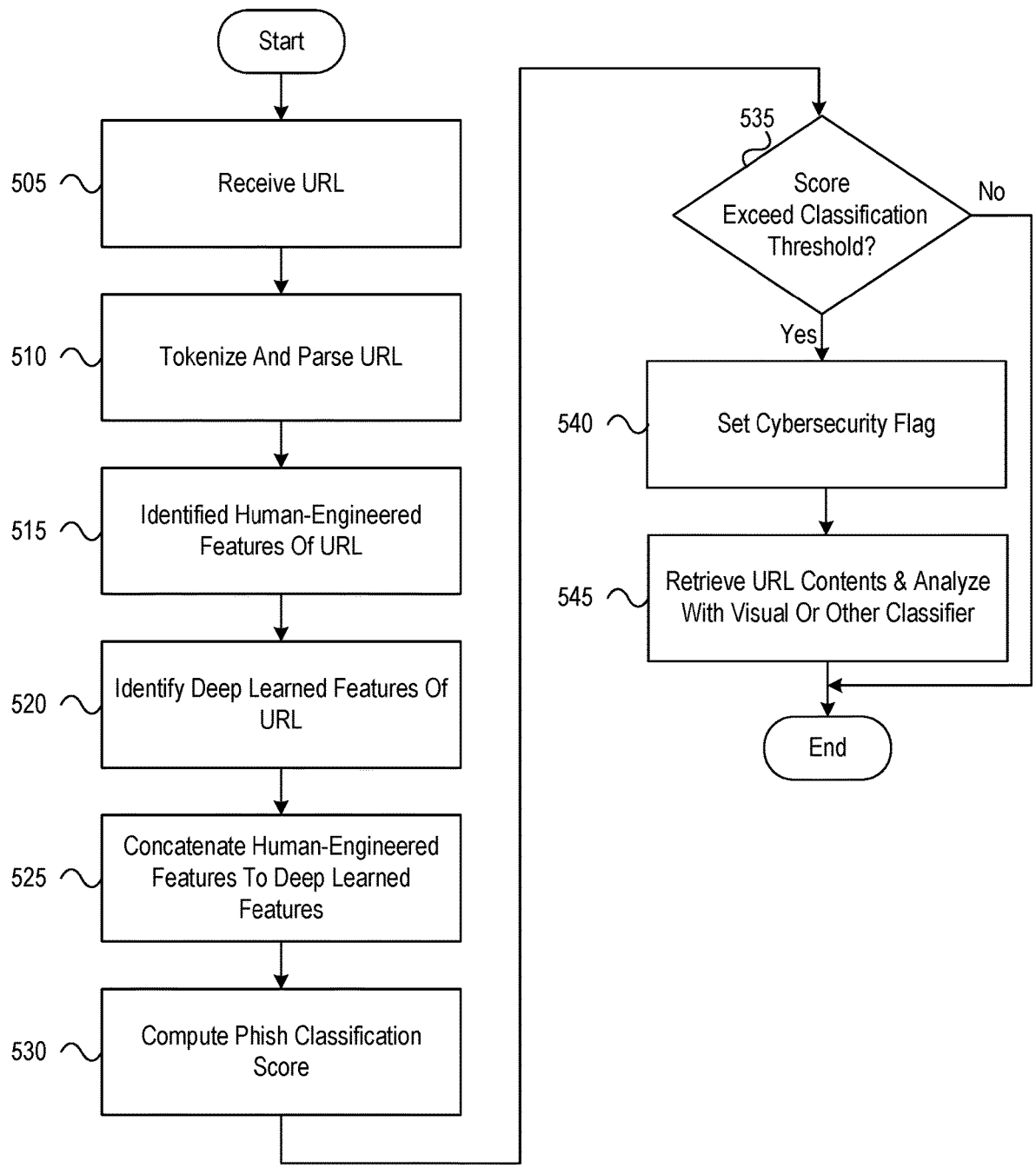
FIGS. 5 and 6 depict illustrative methods for detecting and identifying malicious sites using machine learning in accordance with one or more example embodiments.

FIG. 5 depicts an illustrative method for detecting and identifying malicious sites using machine learning in accordance with one or more example embodiments. Referring to FIG. 5, at step 505, a computing platform having at least one processor, a communication interface, and memory may receive a URL. At step 510, the computing platform may parse and tokenize the URL into a plurality of components. At step 515, the computing platform may identify one or more human-engineered features of the URL. At step 520, the computing platform may compute a vector representation of the URL to identify one or more deep learned features of the URL. At step 525, the computing platform may concatenate the one or more human-engineered features to the one or more deep learned features, resulting in a concatenated vector representation of the URL. At step 530, the computing platform may compute a phish classification score by inputting the concatenated vector representation of the URL into a URL classifier. At step 535, the computing platform may compare the phish classification score to a predetermined phish classification threshold. If the phish classification score does not exceed the predetermined phish classification threshold, the method may end. If the phish classification score does exceed the predetermined phish classification threshold, the computing platform may proceed to step 540. At step 540, the computing platform may set a cybersecurity flag, which may cause a cybersecurity server to perform one or more cybersecurity actions. At step 545, the computing platform may retrieve content from the URL and analyze the content with a visual and/or other classifier.

Figure 6:
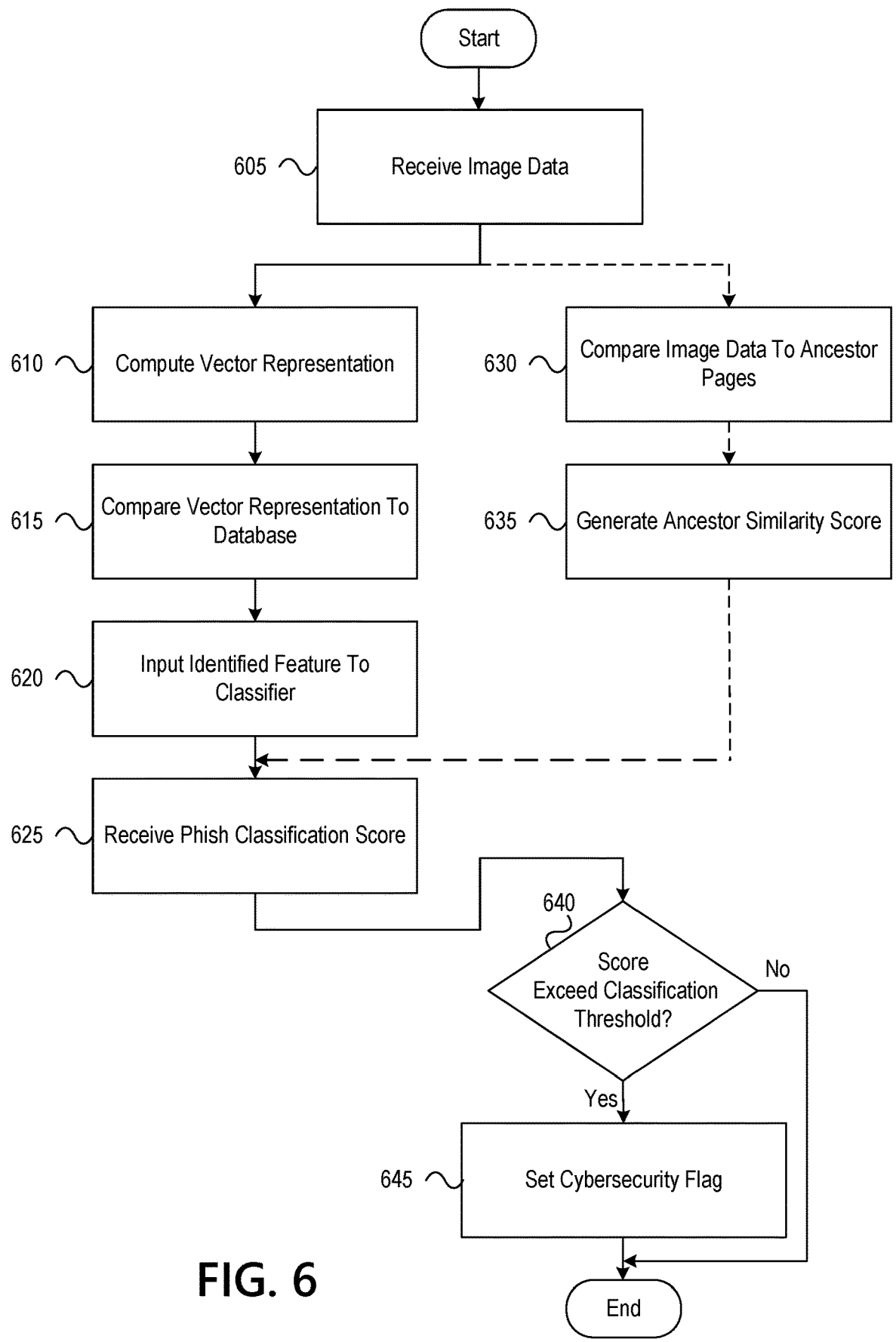

FIG. 6 depicts another illustrative method for detecting and identifying malicious sites using machine learning in accordance with one or more example embodiments. Referring to FIG. 6, at step 605, a computing platform having at least one processor, a communication interface, and memory may receive image data of a graphical rendering of a resource available at a URL. At step 610, the computing platform may compute a computer vision vector representation of the image data. At step 615, the computing platform may compare the computer vision vector representation to a plurality of stored numeric vectors representing page elements, resulting in a feature indicating whether the computer vision vector representation of the image data is visually similar to a known page element. At step 620, the computing platform may input the identified feature into a classifier.

Returning to step 630, which may be performed simultaneously or sequentially with steps 610-625, the computing platform may compare image data to one or more ancestor pages. At step 635, the computing platform may generate an ancestor similarity score. At step 625, the computing platform may receive a phish classification score from the classifier indicating a likelihood that the URL is malicious (which may, e.g., be based on the feature input at step 620 and/or the ancestor similarity score generated at step 635).

At step 640, the computing platform may determine whether the phish classification score exceeds a predetermined phish classification threshold. If the phish classification score does not exceed the predetermined phish classification threshold, the method may end. If the phish classification score does exceed the predetermined phish classification threshold, the computing platform may proceed to step 645. At step 645, the computing platform may set one or more cybersecurity flags, which may cause a cybersecurity server to perform one or more cybersecurity actions.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
     compare a computer vision vector representation of image data to a plurality of stored numeric vectors representing page elements, resulting in a feature indicating whether the computer vision vector representation of the image data is visually similar to a known page element;
     generate, by inputting the feature into a classifier, a phish classification score indicating a likelihood that a URL is malicious;
     in response to determining that the phish classification score exceeds a first phish classification threshold, cause a cybersecurity server to perform a first action; and
     in response to determining that the phish classification score exceeds a second phish classification threshold, cause the cybersecurity server to perform a second action different from the first action, wherein:
       causing the cybersecurity server to perform the first action comprises setting a first flag, and
       causing the cybersecurity server to perform the second action comprises setting a second flag, wherein the first flag and the second flag are set in a cybersecurity database accessible by the cybersecurity server.

2. The computing platform of claim 1, wherein the memory stores additional computer-readable instructions that, when executed by the at least one processor, cause the computing platform to:
   generate a screenshot database, wherein the screenshot database includes images of a plurality of URLs and their corresponding image data, and wherein:
     the plurality of URLs are selected by the computing platform based on one or more of: previous attacks corresponding to the URLs, anticipated attacks corresponding to the URLs, or URL popularity, and
     the plurality of URLs correspond to one or more of: internal websites or external websites.

3. The computing platform of claim 2, wherein the memory stores additional computer-readable instructions that, when executed by the at least one processor, cause the computing platform to:
   update the screenshot database, wherein updating the screenshot database comprises:
     identifying that a page image corresponding to a URL of the plurality of URLs has changed, wherein a previous page image corresponding to the URL of the plurality of URLs is stored in the screenshot database; and in response to determining that the page image corresponding to a URL of the plurality of URLs has changed:
capturing the page image corresponding to the URL of the plurality of URLs, resulting in a captured page image corresponding to the URL of the plurality of URLs; and
adding the captured page image corresponding to the URL of the plurality of URLs to the screenshot database.

4. The computing platform of claim 2, wherein generating the screenshot database comprises computing, for each URL of the plurality of URLs, a computer vision vector representation of image data corresponding to the URL.

5. The computing platform of claim 1, wherein comparing the computer vision vector representation of the image data to the plurality of stored numeric vectors representing page elements comprises:
identifying, using a hash table lookup function, an exact match between the image data and a specific page element of the page elements, or
identifying, using a nearest neighbor search or radius search, an inexact match between the computer vision vector representation of the image data and the specific page element vector of the page elements vectors.

6. The computing platform of claim 1, wherein the memory stores additional computer-readable instructions that, when executed by the at least one processor, cause the computing platform to:
compare the image data of the URL to image data captured from one or more ancestor pages, wherein the comparison results in an ancestor similarity score.

7. The computing platform of claim 6, wherein the memory stores additional computer-readable instructions that, when executed by the at least one processor, cause the computing platform to:
identify page elements of the one or more ancestor pages.

8. The computing platform of claim 7, wherein comparing the image data of the URL to the image data captured from the one or more ancestor pages comprises comparing page elements of the URL to the identified page elements of the one or more ancestor pages.

9. The computing platform of claim 8, wherein comparing the image data of the URL to the image data captured from the one or more ancestor pages comprises:
generating, for the one or more ancestor pages, an object list that includes the corresponding identified page elements;
applying object detection to the image data of the URL to identify included objects, wherein the identified included objects comprise one or more of: a logo, a brand graphic, a login pane, a logo aspect ratio, or a background image; and
comparing the identified included objects to the object list.

10. The computing platform of claim 7, wherein comparing the image data of the URL to the image data captured from the one or more ancestor pages comprises performing:
a visual comparison, wherein the visual comparison comprises one or more of: a color analysis, a deep learning vector comparison, logo comparison, or optical character comparison between a graphical rendering of the URL and the one or more ancestor pages, or
a non-visual comparison, wherein the non-visual comparison comprises a comparison of markup, code, or text corresponding to the URL and markup, code, or text corresponding to the one or more ancestor pages.

11. The computing platform of claim 1, wherein the computer vision vector representation of the image data is computed using a convolutional neural network, and wherein the convolution neural network is trained using metric learning.

12. The computing platform of claim 1, wherein:
the known page element is one of: a rendered page screenshot, a logo, login form, or other visual page element; and
the classifier is a machine learning classifier or a rule-based classifier.

13. The computing platform of claim 1, wherein the memory stores additional computer-readable instructions that, when executed by the at least one processor, cause the computing platform to:
receive image data of a graphical rendering of a resource available at the URL; and
compute the computer vision vector representation of the image data.

14. The computing platform of claim 1, wherein the cybersecurity database is hosted by one of: the computing platform or a central repository.

15. The computing platform of claim 1, wherein the cybersecurity server is configured to monitor the cybersecurity database at a predetermined interval to detect flags.

16. The computing platform of claim 15, wherein performing the first action comprises, in response to detecting the first flag, generating one or more commands directing another classification platform to analyze the URL; and
wherein performing the second action comprises, in response to detecting the second flag, one or more of:
generating one or more commands directing another computing device to display a graphical user interface indicating that the URL is malicious, or
adding the URL to a list of blocked URLs.

17. The computing platform of claim 16, wherein generating the one or more commands directing the other classification platform to analyze the URL comprises generating one or more commands directing the other classification platform to analyze content of the URL using a holistic classifier.

18. The computing platform of claim 16, wherein the memory stores additional computer-readable instructions that, when executed by the at least one processor, cause the computing platform to:
based on a failure to detect a flag, determine that the phish classification score does not exceed the first phish classification threshold; and
determine, based on the determination that the phish classification score does not exceed the first phish classification threshold, that the URL is legitimate.

19. A method, comprising:
at a computing platform comprising at least one processor, a communication interface, and memory:
comparing a computer vision vector representation of image data to a plurality of stored numeric vectors representing page elements, resulting in a feature indicating whether the computer vision vector representation of the image data is visually similar to a known page element;
generating, by inputting the feature into a classifier, a phish classification score indicating a likelihood that a URL is malicious;
in response to determining that the phish classification score exceeds a first phish classification threshold, causing a cybersecurity server to perform a first action; and in response to determining that the phish classification score exceeds a second phish classification threshold, causing the cybersecurity server to perform a second action different from the first action, wherein:

causing the cybersecurity server to perform the first action comprises setting a first flag, and causing the cybersecurity server to perform the second action comprises setting a second flag, wherein the first flag and the second flag are set in a cybersecurity database accessible by the cybersecurity server.

20. One or more non-transitory computer-readable media storing instructions that, when executed by a computing platform comprising at least one processor, a communication interface, and memory, cause the computing platform to:

compare a computer vision vector representation of image data to a plurality of stored numeric vectors representing page elements, resulting in a feature indicating whether the computer vision vector representation of the image data is visually similar to a known page element;

generate, by inputting the feature into a classifier, a phish classification score indicating a likelihood that a URL is malicious;

in response to determining that the phish classification score exceeds a first phish classification threshold, cause a cybersecurity server to perform a first action; and in response to determining that the phish classification score exceeds a second phish classification threshold, cause the cybersecurity server to perform a second action different from the first action, wherein:

causing the cybersecurity server to perform the first action comprises setting a first flag, and causing the cybersecurity server to perform the second action comprises setting a second flag, wherein the first flag and the second flag are set in a cybersecurity database accessible by the cybersecurity server.

\* \* \* \* \*